US012511934B2

(12) United States Patent
Matsunami

(10) Patent No.: US 12,511,934 B2
(45) Date of Patent: Dec. 30, 2025

(54) FACE AUTHENTICATION METHOD, STORAGE MEDIUM, AND FACE AUTHENTICATION DEVICE

(71) Applicant: FUJITSU LIMITED, Kawasaki (JP)

(72) Inventor: Tomoaki Matsunami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 365 days.

(21) Appl. No.: 18/178,798

(22) Filed: Mar. 6, 2023

(65) Prior Publication Data

US 2023/0206686 A1 Jun. 29, 2023

Related U.S. Application Data

(63) Continuation of application No. PCT/JP2020/035334, filed on Sep. 17, 2020.

(51) Int. Cl.
*G06V 40/16* (2022.01)
*G06F 21/32* (2013.01)
(Continued)

(52) U.S. Cl.
CPC ............ *G06V 40/168* (2022.01); *G06F 21/32* (2013.01); *G06V 10/60* (2022.01); *G06V 40/172* (2022.01); *G06V 40/40* (2022.01)

(58) Field of Classification Search
CPC .... G06V 40/168; G06V 10/60; G06V 40/172; G06V 40/40; G06F 21/32
See application file for complete search history.

(56) References Cited

U.S. PATENT DOCUMENTS

2004/0165754 A1* 8/2004 Tabata ................ G06V 40/161
382/118
2014/0230046 A1 8/2014 Dewan et al.
(Continued)

FOREIGN PATENT DOCUMENTS

EP 2680192 A2 1/2014
JP H11-339048 A 12/1999
(Continued)

OTHER PUBLICATIONS

Japanese Office Action mailed Aug. 8, 2023 for corresponding Japanese Patent Application No. 2022-550277, with English Translation, 8 pages.
EESR—Extended European Search Report of European Patent Application No. 20954136.6 dated Oct. 11, 2023.
(Continued)

*Primary Examiner* — Wassim Mahrouka
(74) *Attorney, Agent, or Firm* — Fujitsu Intellectual Property Center

(57) ABSTRACT

A face authentication method for a computer to execute a process includes acquiring a plurality of images from a camera; acquiring a contour change degree that represents a difference between a first contour included in an image imaged in a first image and a second contour included in the face image imaged in a second image, the plurality of images including the first image and the second image; acquiring a reflection change degree that represents a difference between first light reflection characteristic of the first image and second light reflection characteristic of the second image; and determining whether imaging targets of the camera has switched, based on the contour change degree and the reflection change degree.

12 Claims, 17 Drawing Sheets

(51) Int. Cl.
 *G06V 10/60* (2022.01)
 *G06V 40/40* (2022.01)

(56) References Cited

U.S. PATENT DOCUMENTS

2018/0173980 A1* 6/2018 Fan .................. G06V 40/45
2020/0082161 A1 3/2020 Morishita

FOREIGN PATENT DOCUMENTS

| | | |
|---|---|---|
| JP | 2004-054788 A | 2/2004 |
| JP | 2004-234355 A | 8/2004 |
| JP | 2009-237629 A | 10/2009 |
| JP | 2015-176555 A | 10/2015 |
| WO | 2018/072028 A1 | 4/2018 |

OTHER PUBLICATIONS

S.T. Gandhe et al., "Face Recognition Using Contour Matching", IAENG International Journal of Computer Science, vol. 35, Issue 2 (IJCS_32_2_06), International Associations of Engineers, May 20, 2008, pp. 1-8 [retrieved on Nov. 19, 2020] (Total 8 pages) [online] http://iaeng.org/IJCS/issues_v35/issue_2/IJCS_35_2_06.pdf. (Cited in ISR).

Daisuke Miyazaki et al., "Polarization-based Inverse Rendering from a Single View", IEEE Computer Society, Proceedings of the Ninth IEEE International Conference on Computer Vision (ICCV'03), pp. 982-987, Nice, France, Oct. 2003 (Total 6 pages).

International Search Report and Written Opinion of the International Searching Authority (Form PCT/ISA/210, 220, and 237), mailed in connection with PCT/JP2020/035334 and mailed Dec. 1, 2020 (Total 12 pages).

\* cited by examiner ered to make a user perform a specified action. For example, in a
FACE AUTHENTICATION METHOD, STORAGE MEDIUM, AND FACE AUTHENTICATION DEVICE

CROSS-REFERENCE TO RELATED APPLICATION

This application is a continuation application of International Application PCT/JP2020/035334 filed on Sep. 17, 2020 and designated the U.S., the entire contents of which are incorporated herein by reference.

FIELD

The present invention relates to a face authentication method, a storage medium, and a face authentication device.

BACKGROUND

There is a case where biometric authentication is used for personal identification. The biometric authentication uses biometric information representing individual physical characteristics to perform personal authentication. One of the biometric authentication is face authentication. The face authentication is a technique for identifying an individual by comparing biometric information representing a feature of a face of the individual.

Since a face image of an individual is used for face authentication, it is possible for a third party to impersonate another person using a photograph in which a face of the another person is imaged. For example, the face image of the another person is easily obtained via a social networking service (SNS) or the like. A malicious third party can pretend to be another person and can be authenticated, by holding a face image of the another person in front of a camera of a face authentication system.

As a technique for preventing impersonation by another person, for example, an individual identification device has been proposed that determines whether or not an image captured by an imaging device is an image obtained by imaging a human and stops processing if the image is not the image obtained by imaging the human so as to improve security.

A technique for extracting features of an object imaged in an image from the image includes, for example, a contour extraction technique, a reflection characteristics calculation technique, or the like. For example, a technique for separating an original image into a specular reflection component and a diffuse reflection component has been proposed.

Patent Document 1: Japanese Laid-open Patent Publication No. 2004-054788, Non-Patent Document 1: Daisuke Miyazaki, Robby T. Tan, Kenji Hara, Katsushi Ikeuchi, "Polarization-based Inverse Rendering from a Single View", Proceedings of the Ninth IEEE International Conference on Computer Vision, pp. 982-987, Nice, France, 2003 December.

SUMMARY

According to an aspect of the embodiments, a face authentication method for a computer to execute a process includes acquiring a plurality of images from a camera; acquiring a contour change degree that represents a difference between a first contour included in an image imaged in a first image and a second contour included in the face image imaged in a second image, the plurality of images including the first image and the second image; acquiring a reflection change degree that represents a difference between first light reflection characteristic of the first image and second light reflection characteristic of the second image; and determining whether imaging targets of the camera has switched, based on the contour change degree and the reflection change degree.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

As a countermeasure against impersonation using a photograph of another person, for example, it is considered to make a user perform a specified action. For example, in a case where an action such as turning right is specified and the user imaged by the camera performs the specified action, it can be determined that the person imaged in the camera is a real person, not a photograph.

However, if the photograph and the real person are switched during action detection, there is a possibility that unauthorized authentication is succeeded. For example, by switching to the real face in front of the camera and performing the specified action after holding the photograph in front of the camera first, it is possible to make it appear as if the person imaged in the photograph performs the action. With the typical technique, it is difficult to detect a fraudulent act made by switching the imaging targets of the camera in the middle of authentication.

In one aspect, an object of this case is to make it possible to easily detect switching of imaging targets in the middle of authentication.

According to one aspect, it is possible to easily detect switching of imaging targets during authentication.
The above-described object and other objects, features, and advantages of the present invention will become clear from the following description related to the accompanying drawings, which illustrate preferred embodiments as examples of the present invention.

Hereinafter, the present embodiment will be described with reference to the drawings. Note that each of the embodiments may be implemented in combination with a plurality of embodiments as long as no contradiction arises.

First Embodiment

First, a first embodiment will be described. The first embodiment is a face authentication method that can easily detect switching of imaging targets of a camera in face authentication during authentication.

Figure 1:
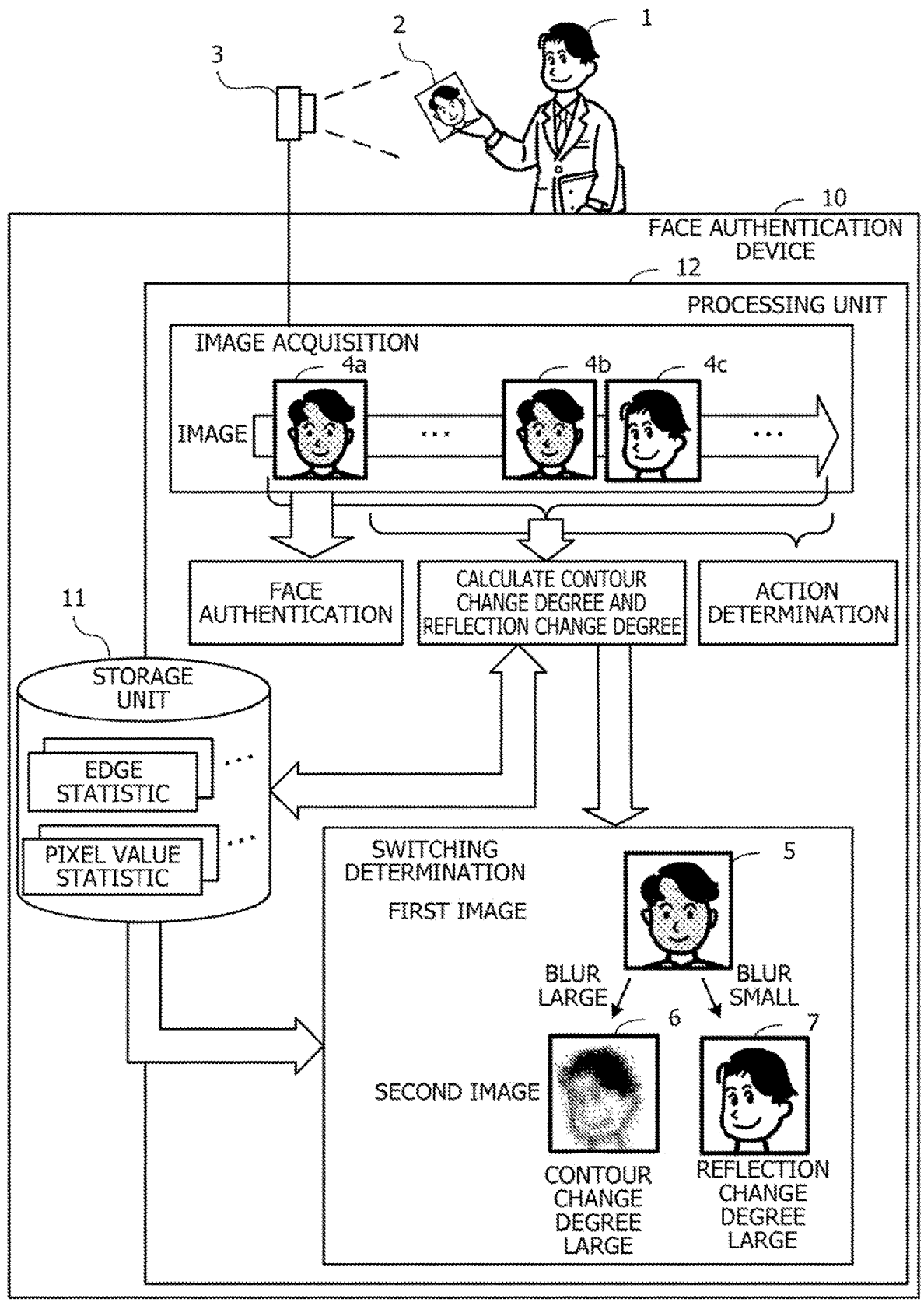
FIG. 1 is a diagram illustrating an example of a face authentication method.

FIG. 1 is a diagram illustrating an example of a face authentication method. In FIG. 1, a face authentication device 10 that implements the face authentication method is illustrated. The face authentication device 10 can perform the face authentication method, for example, by executing a face authentication program.

The face authentication device 10 includes a storage unit 11 and a processing unit 12. The storage unit 11 is, for example, a memory or a storage device included in the face authentication device 10. The processing unit 12 is, for example, a processor or an arithmetic circuit included in the face authentication device 10.

The storage unit 11 stores edge statistic information and pixel value statistic information for each of images 4a, 4b, 4c, . . . captured by a camera 3. The edge statistic information is information obtained by executing statistically processing on a luminance value of each pixel in an image so as to clarify an edge (portion where luminance largely changes) that appears on the contour of the face. The contour of the face may be a contour of a portion that is a part of the face (for example, nose). The pixel value statistic information is information obtained by executing statistically processing on the luminance value of each pixel in the image so as to clarify reflection characteristics of light. The pixel value statistic information is calculated, for example, using only pixels in a region where a face of a person is imaged. Furthermore, the pixel value statistic information may be calculated, for example, using only pixels in a region where a portion that is a part of the face (for example, cheeks) is imaged.

The processing unit 12 executes authentication processing of a user 1 in front of the camera 3, based on the plurality of images 4a, 4b, 4c, . . . acquired from the camera 3. For example, the processing unit 12 acquires the plurality of time-series images 4a, 4b, 4c, . . . from the camera 3.

The processing unit 12 executes face authentication processing, based on biometric features represented by a face image imaged in an image (third image) among the plurality of images 4a, 4b, 4c, . . . . The face authentication processing is processing for authenticating a user based on a face image imaged in the acquired image. For example, the processing unit 12 compares a feature representing features of a face image of a user who has been registered in advance with a feature of the face image imaged in the acquired image and authenticates that the face image imaged in the acquired image is the face image of the user who has been registered in advance if a similarity is equal to or more than a predetermined value. The face authentication is succeeded when such authentication is made.

Furthermore, the processing unit 12 calculates a contour change degree that represents a difference between contours of face images respectively imaged in two time-series consecutive images (first image 5 and second image 6 or second image 7) and a reflection change degree that represents a difference between light reflection characteristics of the first image 5 and the second image 6 or the second image 7.

For example, each time when one frame of a moving image captured by the camera 3 is acquired, the processing unit 12 calculates an edge statistic and a pixel value statistic of an image of the frame in real time. The processing unit 12 stores the calculated edge statistic and pixel value statistic in the storage unit 11. Furthermore, the processing unit 12 calculates the contour change degree based on an edge statistic of the most recent first image 5 in the past and a newly acquired edge statistic of the second image 6 or the second image 7. Moreover, the processing unit 12 calculates the reflection change degree based on the most recent pixel value statistic of the first image 5 in the past and the newly acquired pixel value statistic of the second image 6 or the second image 7.

Then, the processing unit 12 determines whether or not the imaging target of the camera 3 is switched, based on the contour change degree and the reflection change degree. For example, in a case where the contour change degree is equal to or more than a first threshold and in a case where the reflection change degree is equal to or more than a second threshold, the processing unit 12 determines that switching has occurred.

Furthermore, the processing unit 12 instructs a person imaged in the camera 3 to perform a predetermined action while the plurality of images 4a, 4b, 4c, . . . is acquired. For example, when the face authentication is succeeded, the processing unit 12 issues an action instruction with audio output or screen display. The processing unit 12 executes action determination processing for determining whether or not a predetermined action is performed, based on an image (fourth image) acquired after instructing the action.

In a case where authentication is succeeded in the face authentication processing and it is determined that the predetermined action is performed through the action determination processing, the processing unit 12 executes processing according to the authentication success. The processing according to the authentication success is, for example, unlocking a door, removing use restrictions of devices, withdrawing or transferring cash from an automatic teller machine (ATM), or the like.

With such a face authentication device 10, in a case where the imaging targets of the camera 3 are switched in a process of the authentication processing involving the face authentication, it is possible to easily detect the switching of the imaging targets. For example, a case is assumed where the user 1 tries unauthorized authentication by being face-authenticated with a photograph 2 of another person who can be authenticated as a user, and then, performing an action according to an action instruction with a real face of the user 1.

First, when the user 1 holds the photograph 2 in front of the camera 3, the processing unit 12 of the face authentication device 10 executes the face authentication processing. When the face authentication is succeeded, the processing unit 12 instructs the user 1 to perform an action such as "please turn right". The user 1 who has received the action instruction removes the photograph 2 from the front of the camera 3, and sets the own face to be captured by the camera 3. Then, the user 1 performs an action according to the instruction.

The processing unit 12 performs switching determination and action determination each time when a one-frame image is acquired from the camera 3, after the action instruction. While the photograph 2 is placed in front of the camera 3, both of the contour change degree and the reflection change degree are small, and switching is not detected. Furthermore, since it is not possible to make the image of the photograph 2 perform the instructed action, the instructed action is not detected through the action determination.

When the user 1 removes the photograph 2 from the front of the camera 3, the image captured by the camera 3 is, for example, changed from the image 4b in which the photograph 2 is imaged to the image 4c in which the face of the user 1 is imaged. At this time, if an image blur is large, it is possible to easily detect switching, based on the contour change degree. For example, in a case where the blur is large, the first image 5 is transitioned to the second image 6. If the blur is large, a position and a thickness of the contour largely change. Therefore, the contour change degree increases, and the switching is detected.

Furthermore, if the blur of the image is small, it is possible to easily detect the switching based on the reflection change degree. For example, in a case where the blur is small, the first image 5 is transitioned to the second image 7. If the blur is small, the pixel value statistic indicating the reflection characteristics of the face image imaged in the image can be calculated with high accuracy. Unevenness and a skin color of a face differ from person to person, when faces to be the imaging target of the camera 3 are switched, even if that is switching of real faces of two persons, light reflection characteristics are clearly different. Therefore, the reflection change degree increases, and the switching is detected.

Here, the processing unit 12 calculates the contour change degree and the reflection change degree and determines whether or not the switching has occurred, for example, for each pair of time-series consecutive images acquired within a period including a time when the third image used for the face authentication processing is acquired and a time when the fourth image used for the action determination processing is acquired. As a result, a fraudulent act for successfully performing the action determination by switching the photograph 2 to the own face after the face authentication has successfully performed using the photograph 2 can be reliably prevented.

Furthermore, in a case where a value (for example, total) calculated based on the contour change degree and the reflection change degree when determining whether or not the switching has occurred is equal to or more than a third threshold, the processing unit 12 may determine that the switching has occurred. For example, in a case where the contour change degree is less than the first threshold and is a value not small to some extent, as a cause of the generated image blur, both of switching and a movement of a real person's face can be considered. Therefore, in a case where both of the contour change degree and the reflection change degree are large values to some extent, it is possible to improve fraudulent act detection accuracy by determining that the switching has occurred.

Moreover, the processing unit 12 may calculate reflection scores of a specular reflection component and a diffuse reflection component of the first image or the second image and use the reflection scores for the switching determination. The specular reflection component is a reflection component of light of which an incidence angle and a reflection angle are equal. The specular reflection is also referred to as regular reflection. The diffuse reflection is a component obtained by removing the specular reflection from the light reflection. The diffuse reflection is also referred to as irregular reflection.

For example, the processing unit 12 determines whether or not switching of imaging targets of a camera has occurred, based on a result of comparing the reflection score with a fourth threshold. For example, the reflection score becomes a larger value as a face imaged in the image is more likely to be a falsification. In this case, the processing unit 12 determines that the switching of the imaging targets of the camera 3 has occurred in a case where the reflection score is equal to or more than the fourth threshold.

By performing the switching determination using the reflection score, in a case where an image in which a forgery can be determined based on the specular reflection component and the diffuse reflection component is included, it is possible to cause the authentication processing to be failed and to improve the fraudulent act detection accuracy.

Second Embodiment

Next, a second embodiment will be described. The second embodiment is an authentication system that can detect switching of authentication targets during face authentication. Such a biometric authentication system is used for access control to devices such as bank automatic teller machines (ATM), room entry management, border control, or the like.

Figure 2:
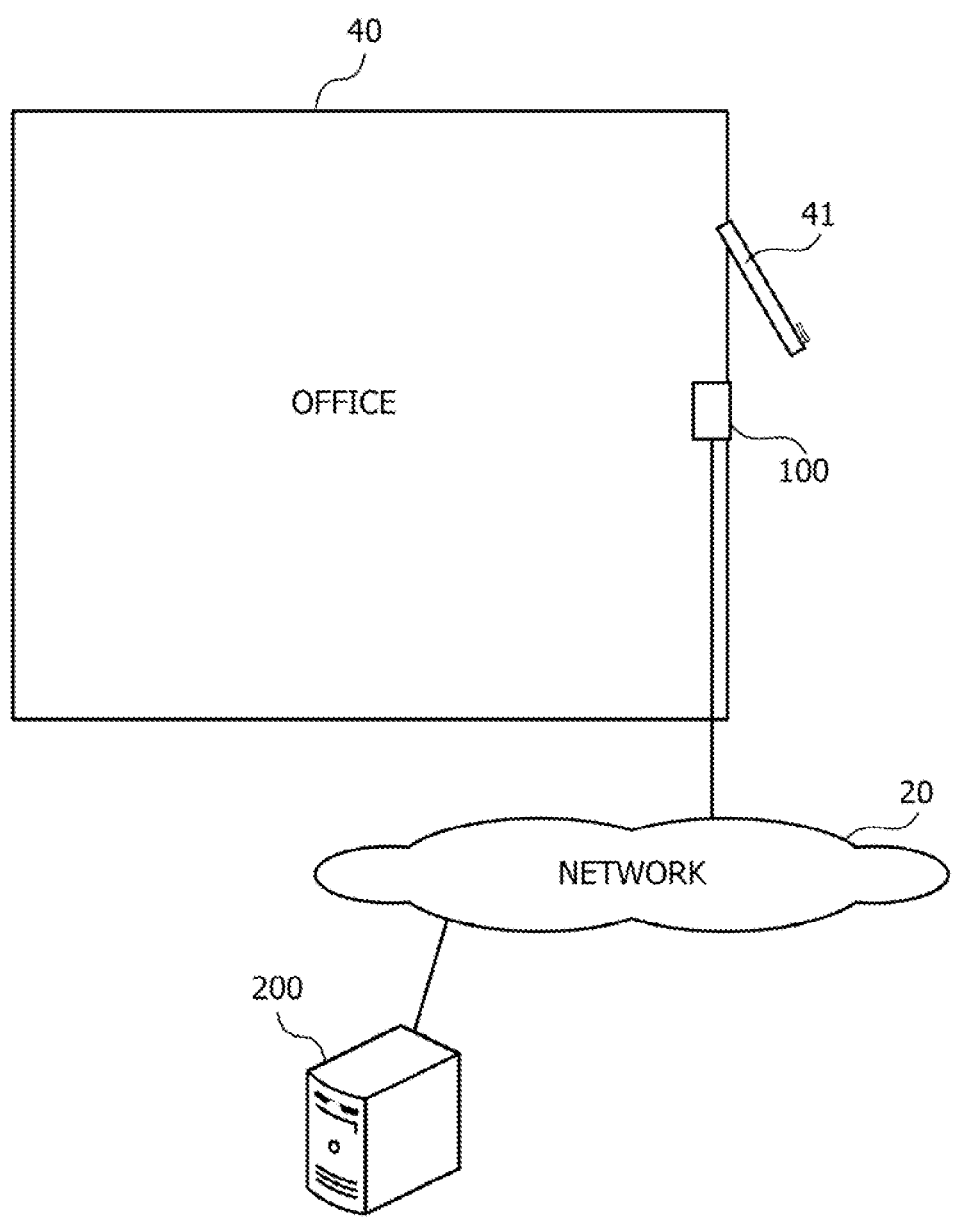
FIG. 2 is a diagram illustrating an example of a biometric authentication system.

FIG. 2 is a diagram illustrating an example of the biometric authentication system. In FIG. 2, an example of room entry management to an office 40 using the biometric authentication system is illustrated. A face authentication device 100 is installed beside a door 41 of the office 40. The face authentication device 100 performs personal authentication based on a face image of a user and controls an electronic lock of the door 41 according to an authentication result.

The face authentication device 100 is coupled to a server 200 via a network 20, for example. The server 200 stores feature data for face authentication obtained from a face image of a user who has permitted to enter the office 40. Furthermore, the server 200 can collate the feature data for face authentication and feature data obtained from a face image of a user who wishes to enter the room and determine whether the user is the same person as a user who has been registered in advance.

For example, the face authentication device 100 images a face of a user who tries to enter the room and generates feature data for face authentication from the obtained face image. Then, the face authentication device 100 transmits the generated feature data to the server 200 and requests collation with the feature data of the user who has permitted to enter the room. In a case where it is determined that the person is the same person as the user who has permitted to enter the room as a result of the collation by the server 200, the face authentication device 100 confirms that the person imaged by the camera is a real person and unlocks the electronic lock of the door 41 when the confirmation can be made.

Figure 3:
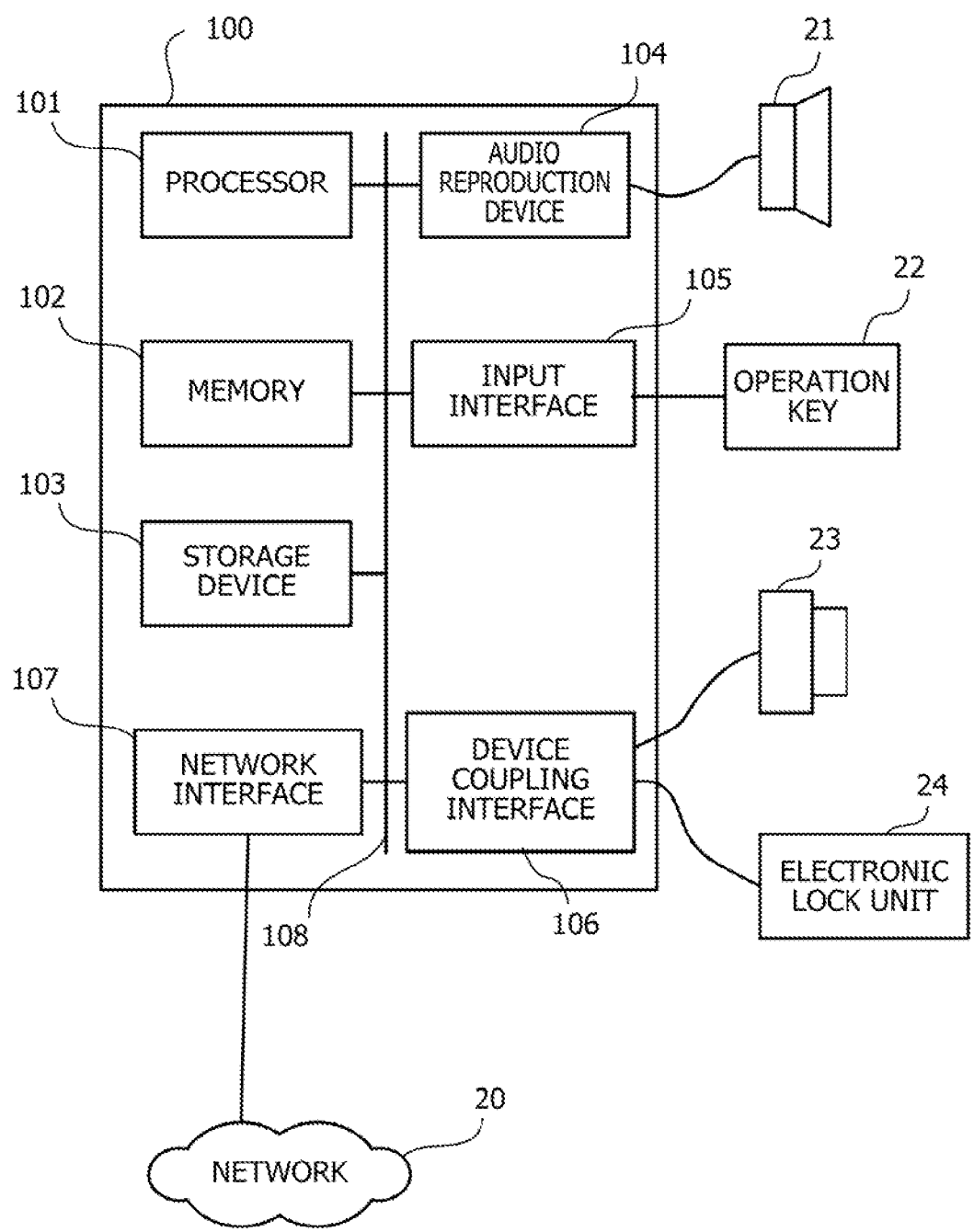
FIG. 3 is a diagram illustrating an example of hardware of a face authentication device.

FIG. 3 is a diagram illustrating an example of hardware of the face authentication device. The entire face authentication device 100 is controlled by a processor 101. A memory 102 and a plurality of peripheral devices are coupled to the processor 101 via a bus 108. The processor 101 may be a multiprocessor. The processor 101 is, for example, a central processing unit (CPU), a micro processing unit (MPU), or a digital signal processor (DSP). At least some functions implemented by the processor 101 executing the program may be implemented by an electronic circuit such as an application specific integrated circuit (ASIC) or a programmable logic device (PLD).

The memory 102 is used as a main storage device of the face authentication device 100. The memory 102 temporarily stores at least some operating system (OS) programs and application programs to be executed by the processor 101. Furthermore, the memory 102 stores various types of data to be used in processing by the processor 101. As the memory 102, for example, a volatile semiconductor storage device such as a random access memory (RAM) is used.

The peripheral devices coupled to the bus 108 include a storage device 103, an audio reproduction device 104, an input interface 105, a device coupling interface 106, and a network interface 107.

The storage device 103 writes and reads data electrically or magnetically to and from a built-in recording medium. The storage device 103 is used as an auxiliary storage device of a computer. The storage device 103 stores OS programs, application programs, and various types of data. Note that, as the storage device 103, for example, a hard disk drive (HDD) or a solid state drive (SSD) may be used.

A speaker 21 is coupled to the audio reproduction device 104. The audio reproduction device 104 converts digital audio data into an analog audio signal according to an instruction from the processor 101 and outputs the signal to the speaker 21. As a result, sound is output from the speaker 21.

An operation key 22 is coupled to the input interface 105. The input interface 105 transmits signals sent from the operation key 22 to the processor 101.

The device coupling interface 106 is a communication interface for coupling the peripheral devices to the face authentication device 100. For example, the device coupling interface 106 can be coupled to a camera 23 and an electronic lock unit 24. The camera 23 captures an image using an imaging element such as a charge-coupled device (CCD). The device coupling interface 106 transfers image data for each one frame imaged by the camera 23 to the memory 102, for example. The electronic lock unit 24 locks and unlocks a key of the door 41 (refer to FIG. 2) according to an input signal. For example, when receiving the signal to unlock the door 41 from the processor 101 via the device coupling interface 106, the electronic lock unit 24 controls a motor built in a key mechanism of the door 41 and unlocks the key.

The network interface 107 is coupled to the network 20. The network interface 107 exchanges data with the server 200 via the network 20. The network interface 107 is a wired communication interface coupled to a wired communication device such as a switch or a router with a cable, for example. Furthermore, the network interface 107 may be a wireless communication interface that is coupled to and communicates with a wireless communication device such as a base station or an access point with radio waves.

The face authentication device 100 may implement processing functions according to the second embodiment with the hardware as described above. Note that the face authentication device 10 described in the first embodiment may also be implemented by hardware similar to that of the face authentication device 100 illustrated in FIG. 3.

The face authentication device 100 implements the processing functions of the second embodiment by executing, for example, a program recorded in a computer-readable recording medium. The program in which processing content to be executed by the face authentication device 100 is described may be recorded in various recording media. For example, the program to be executed by the face authentication device 100 may be stored in the storage device 103. The processor 101 loads at least a part of the programs in the storage device 103 into the memory 102 and executes the program.

Note that a display device is not coupled to the face authentication device 100 illustrated in FIG. 3. However, a graphic processing device can be coupled to the bus 108, and the display device can be coupled to the graphic processing device.

Figure 4:
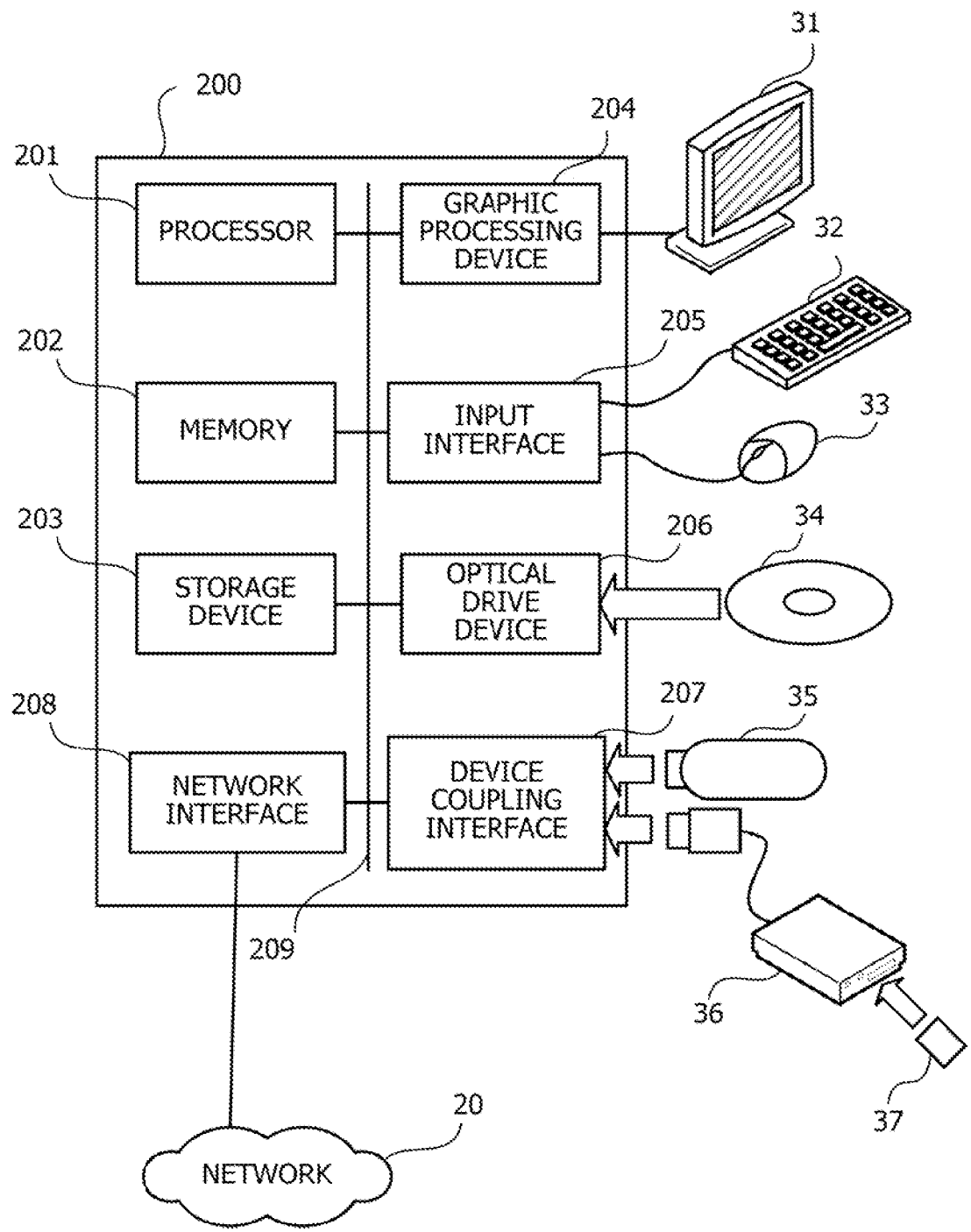
FIG. 4 is a diagram illustrating an example of hardware of a server.

FIG. 4 is a diagram illustrating an example of hardware of a server. The entire server 200 is controlled by a processor 201. A memory 202 and a plurality of peripheral devices are coupled to the processor 201 via a bus 209. The processor 201 may be a multiprocessor. The processor 201 is, for example, a CPU, an MPU, or a DSP. At least some of functions implemented by executing a program by the processor 201 may be implemented by an electronic circuit such as an ASIC or a PLD.

The memory 202 is used as a main storage device of the server 200. The memory 202 temporarily stores at least some OS programs and application programs to be executed by the processor 201. Furthermore, the memory 202 stores various types of data to be used in processing by the processor 201. As the memory 202, for example, a volatile semiconductor storage device such as a RAM is used.

The peripheral devices coupled to the bus 209 include a storage device 203, a graphic processing device 204, an input interface 205, an optical drive device 206, a device coupling interface 207, and a network interface 208.

The storage device 203 writes and reads data electrically or magnetically to and from a built-in recording medium. The storage device 203 is used as an auxiliary storage device of a computer. The storage device 203 stores OS programs, application programs, and various types of data. Note that, as the storage device 203, for example, an HDD or an SSD can be used.

A monitor 31 is coupled to the graphic processing device 204. The graphic processing device 204 displays an image on a screen of the monitor 31 in accordance with an instruction from the processor 201. Examples of the monitor 31 include a display device using an organic electro luminescence (EL), a liquid crystal display device, or the like.

A keyboard 32 and a mouse 33 are coupled to the input interface 205. The input interface 205 transmits signals sent from the keyboard 32 and the mouse 33 to the processor 201. Note that the mouse 33 is an example of a pointing device, and another pointing device may also be used. Examples of the another pointing device include a touch panel, a tablet, a touch pad, a track ball, or the like.

The optical drive device 206 uses laser light or the like to read data recorded in an optical disk 34 or write data to the optical disk 34. The optical disk 34 is a portable recording medium in which data is recorded to be readable by reflection of light. Examples of the optical disk 34 include a digital versatile disc (DVD), a DVD-RAM, a compact disc read only memory (CD-ROM), a CD-recordable (R)/rewritable (RW), or the like.

The device coupling interface 207 is a communication interface for coupling peripheral devices to the server 200. For example, a memory device 35 and a memory reader/writer 36 may be coupled to the device coupling interface 207. The memory device 35 is a recording medium equipped with a communication function with the device coupling interface 207. The memory reader/writer 36 is a device that writes data to a memory card 37 or reads data from the memory card 37. The memory card 37 is a card-type recording medium.

The network interface 208 is coupled to the network 20. The network interface 208 exchanges data with another computer or a communication device via the network 20. The network interface 208 is a wired communication interface coupled to a wired communication device such as a switch or a router with a cable, for example. Furthermore, the network interface 208 may be a wireless communication interface that is coupled to and communicates with a wireless communication device such as a base station or an access point with radio waves.

The server 200 can provide the program to be executed by the face authentication device 100, to the face authentication device 100 via the network 20. For example, the program in which processing content to be executed by the face authentication device 100 is described may be recorded in a portable recording medium such as the optical disk 34, the memory device 35, or the memory card 37. The server 200 transmits the program stored in the portable recording medium to the face authentication device 100. After installing the program sent from the server 200 to the storage device 203, the face authentication device 100 becomes executable.

Next, a function of each device in the biometric authentication system will be described.

Figure 5:
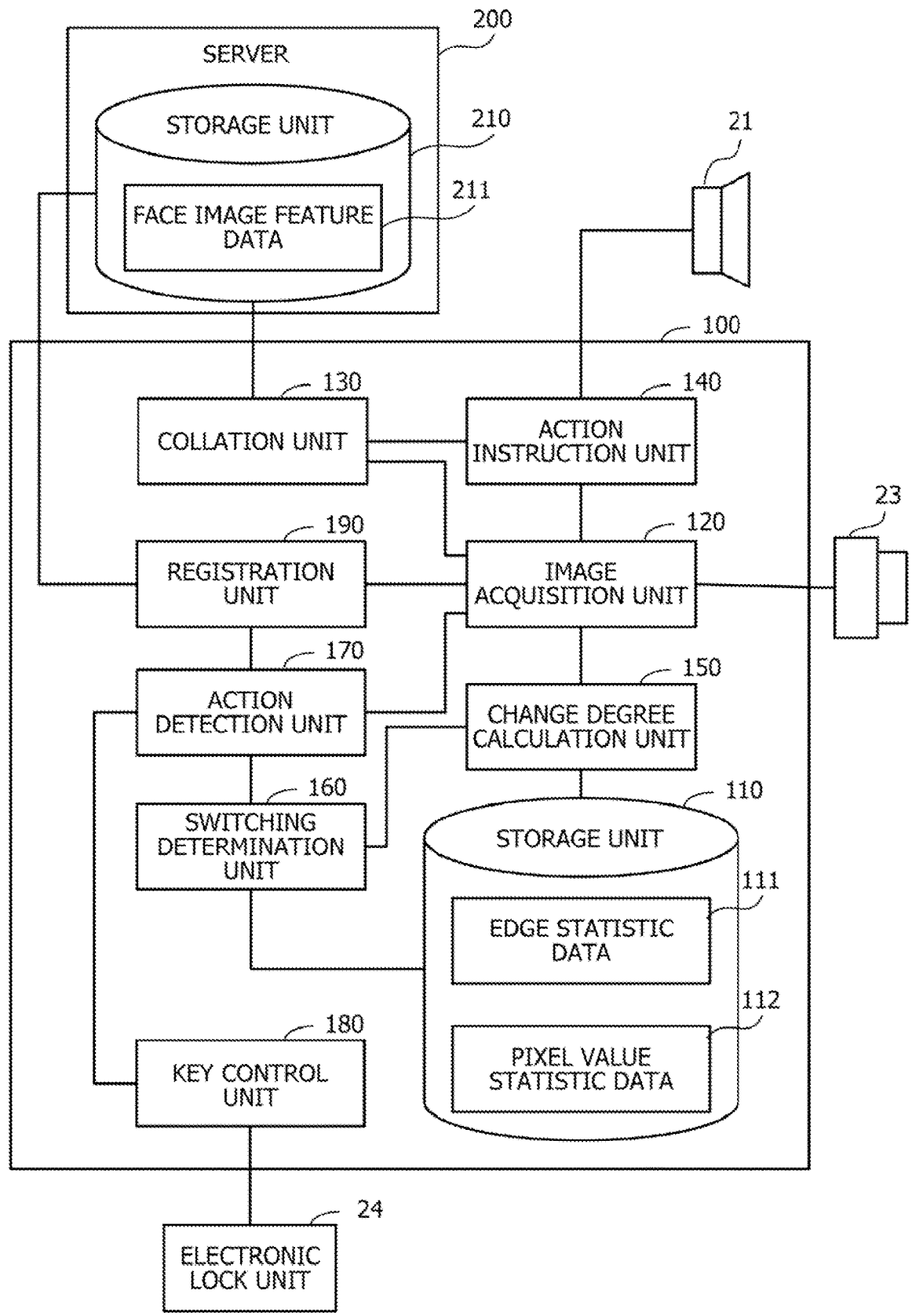
FIG. 5 is a block diagram illustrating an example of a function of each device.

FIG. 5 is a block diagram illustrating an example of the function of each device. The server 200 includes a storage unit 210. The storage unit 210 stores face image feature data 211. The face image feature data 211 is data obtained by quantifying a feature extracted from a face image of a user who is permitted to enter an office. The storage unit 210 is implemented by using a part of a storage region of the storage device 203 included in the server 200, for example.

The face authentication device 100 includes a storage unit 110, an image acquisition unit 120, a collation unit 130, an action instruction unit 140, a change degree calculation unit 150, a switching determination unit 160, an action detection unit 170, a key control unit 180, and a registration unit 190. Of these, the storage unit 110 is implemented by using a part of a storage region of the storage device 103 included in the face authentication device 100, for example. Furthermore, the image acquisition unit 120, the collation unit 130, the action instruction unit 140, the change degree calculation unit 150, the switching determination unit 160, the action detection unit 170, the key control unit 180, and the registration unit 190 are implemented by executing a predetermined program by the processor 101, for example.

The storage unit 110 stores edge statistic data 111 and pixel value statistic data 112. The edge statistic data 111 is information indicating a contour of a face obtained by analyzing a face image for each frame. The pixel value statistic data 112 is information indicating light reflection of the face obtained by analyzing the face image for each frame.

The image acquisition unit 120 acquires an image from the camera 23. A frame rate at which the image is acquired from the camera 23 depends on a time needed for face authentication using a one-frame image. For example, the frame rate for image acquisition is about five to 10 frames per second.

The image acquisition unit 120 transmits the image of the frame used for face authentication to the collation unit 130. Furthermore, the image acquisition unit 120 transmits an image of a frame used to determine whether or not an instructed action is performed (action determination) to the change degree calculation unit 150. The instructed action is facing a specified direction, vertically or horizontally shaking the head, opening or closing the mouth or eyes, or the like.

Upon receiving the image used for face authentication, the collation unit 130 performs user authentication using the received image. For example, the collation unit 130 calculates a feature of a face imaged in the received image. Note that processing for calculating the feature for face authentication is processing that takes more time than extraction of information indicating the contour or information indicating the reflection characteristics. The collation unit 130 collates the calculated feature with a feature of a face image indicated by the face image feature data included in the server 200, in cooperation with the server 200.

For example, the collation unit 130 calculates the feature of the face image imaged in the received image and transmits the feature to the server 200. The server 200 collates the received feature with a feature of each user in the storage unit 210. In a case where a feature of a face image of any one of users who have permitted to enter a room matches the feature of the face image acquired from the image acquisition unit 120 (or similarity is equal to or more than predetermined value), the server 200 determines that the face authentication is succeeded. The server 200 transmits a determination result to the collation unit 130. Note that the collation unit 130 may acquire the face image feature data 211 stored in the storage unit 210 from the server 200 and execute collation processing.

The action instruction unit 140 outputs an action instruction to a user who tries to enter the room in a case where the face authentication has been succeeded. For example, the action instruction unit 140 outputs voice for instructing an action via the speaker 21.

When acquiring an image for action determination from the image acquisition unit 120, the change degree calculation unit 150 calculates a contour change degree indicating a degree of a change in contour information from a past image and a reflection change degree indicating a degree of a change in light reflection characteristics from the past image. For example, the change degree calculation unit 150 calculates an edge statistic and a pixel value statistic of the acquired image. Next, the change degree calculation unit 150 acquires an edge statistic and a pixel value statistic obtained from the most recent image in the past, from the storage unit 110. Then, the change degree calculation unit 150 calculates a difference between the edge statistic of the past image and the edge statistic of the latest image and sets a value indicating the difference as the contour change degree. Furthermore, the change degree calculation unit 150 calculates a difference between the pixel value statistic of the past image and the pixel value statistic of the latest image and sets a value indicating the difference as the reflection change degree.

The switching determination unit 160 determines whether or not imaging targets of the camera 23 are switched, based on the contour change degree and the reflection change degree. For example, after the face authentication has succeeded, the switching determination unit 160 determines whether or not the imaging target of the camera 23 at the time of face authentication is switched to another person, a photograph, or the like.

The action detection unit 170 acquires images of consecutive frames from the image acquisition unit 120 and detects that the user has performed the instructed action. For example, in a case where it is instructed to turn the face to the left or the right, an action can be detected according to a change in an interval between left and right broken curves of the contour of the face and a straight line vertically passing through the nose. For example, it is assumed that a user be instructed to turn to the right and the user perform an action according to the instruction. In this case, an interval between a vertical tangent line of the contour on the right side (left side in image) of the face and the straight line passing through the nose is narrowed, and an interval between a vertical tangent line of the contour on the left side (right side in image) of the face and the straight line passing through the nose increases. By detecting such a change of the interval of the straight lines or the like, it can be determined whether or not the instructed action has been performed.

In a case where a user tries to enter the room, the action detection unit 170 instructs the key control unit 180 to unlock the key, for example, if the switching is not detected. Furthermore, in a case where the user requests to register a face image feature for collation, the action detection unit 170 transmits the face image feature of the user to the registration unit 190 if the switching is not detected.

The key control unit 180 unlocks the key of the door 41, according to an instruction from the action detection unit 170. For example, the key control unit 180 transmits an unlocking instruction to the electronic lock unit 24. Then, the electronic lock unit 24 unlocks the door 41.

The registration unit 190 calculates an image feature of the face image of the user based on the image acquired by the image acquisition unit 120, according to the instruction from the action detection unit 170. Then, the registration unit 190 transmits the calculated image feature to the server 200. The server 200 stores the image feature in the storage unit 210.

Figure 6:
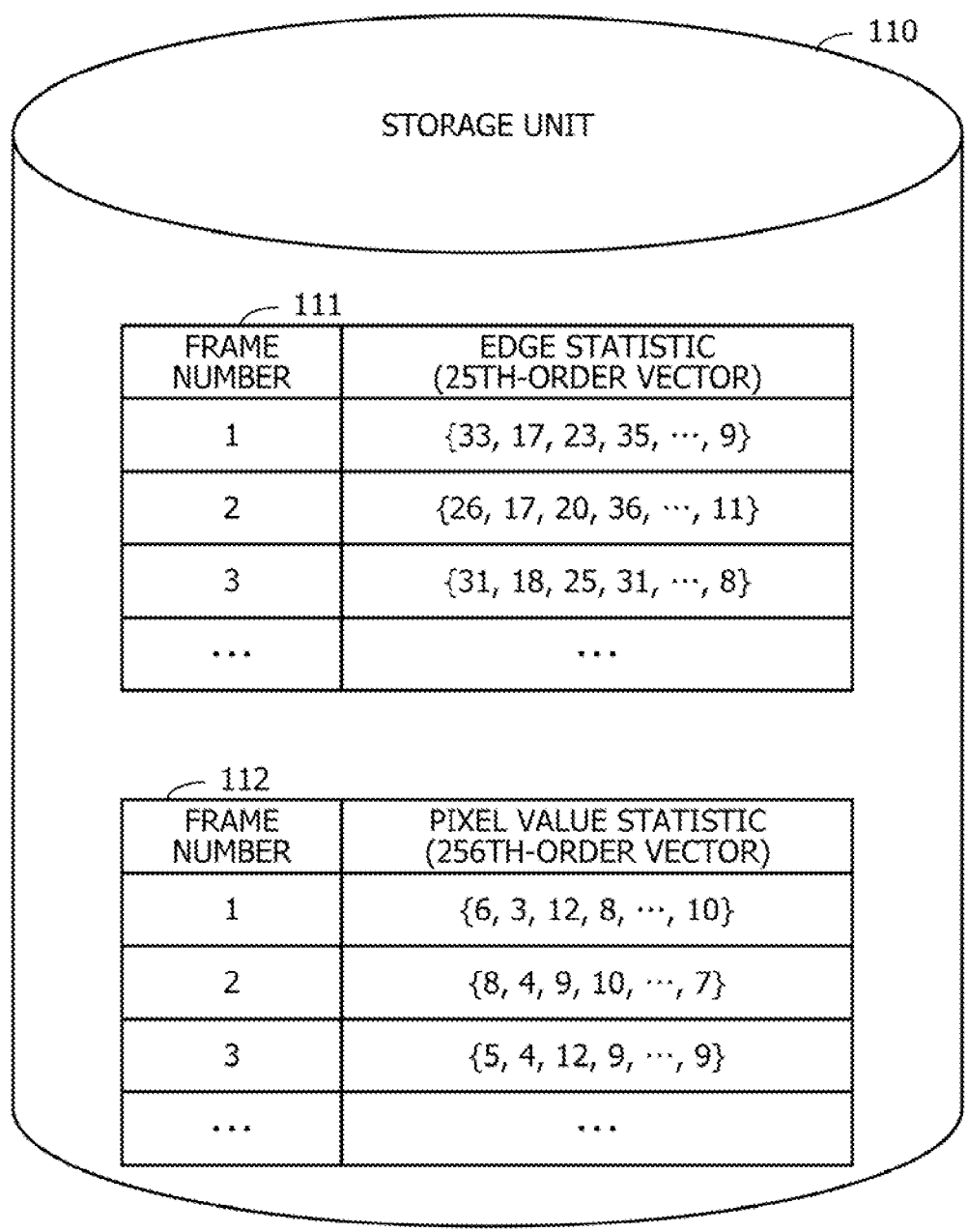
FIG. 6 is a diagram illustrating an example of data included in a storage unit of the face authentication device.

FIG. 6 is a diagram illustrating an example of data included in a storage unit of a face authentication device. In association with a frame number, an edge statistic of the frame is stored in chronological order in the edge statistic data 111. The edge statistic is, for example, a histogram of a higher-order local autocorrelation (HLAC). In the HLAC, a relationship with surrounding pixels is classified into any one of 25 patterns, for each pixel. Then, a 25th-order vector using an appearance frequency of each pattern (the number of pixels to be that pattern) as a component (non-negative integer value) is stored in the edge statistic data 111 as the edge statistic.

In association with a frame number, a pixel value statistic of the frame is stored in the pixel value statistic data 112 in chronological order. The pixel value statistic is, for example, a histogram of a local binary pattern (LBP). In the LBP, any one of values from zero to 255 is calculated based on a magnitude relationship with surrounding pixels, for each pixel. Then, a 256th-order vector using an appearance frequency of each value (the number of pixels to be that value) as a component (non-negative integer value) is stored in the pixel value statistic data 112 as the pixel value statistic.

Note that, in the example in FIG. 6, since the histogram is used as the statistic, a component of a vector indicating the statistic is a non-negative integer value. However, the component of the vector may be a real value depending on the statistic to be used.

With the biometric authentication system having such a function, only in a case where the user who tries to enter the office 40 is authenticated as a user who is permitted to enter the room, the door 41 is unlocked. At this time, the user may attempt to be illegally authenticated using a photograph of another person.

Figure 7:
FIG. 7 is a diagram illustrating an example of a fraudulent act.

FIG. 7 is a diagram illustrating an example of a fraudulent act. A user 42 is in front of the door 41 with a photograph 43 in his/her hand. In the photograph 43, another user who is permitted to enter the office 40 is imaged. Note that the user 42 is not permitted to enter the office 40.

It is assumed that the user 42 attempt face authentication by holding the photograph 43 in front of the camera 23. The face authentication device 100 that has recognized that a face is imaged in front of the camera 23 performs face authentication based on an image captured by the camera 23, outputs an action instruction from the speaker 21, and performs action determination.

Figure 8:
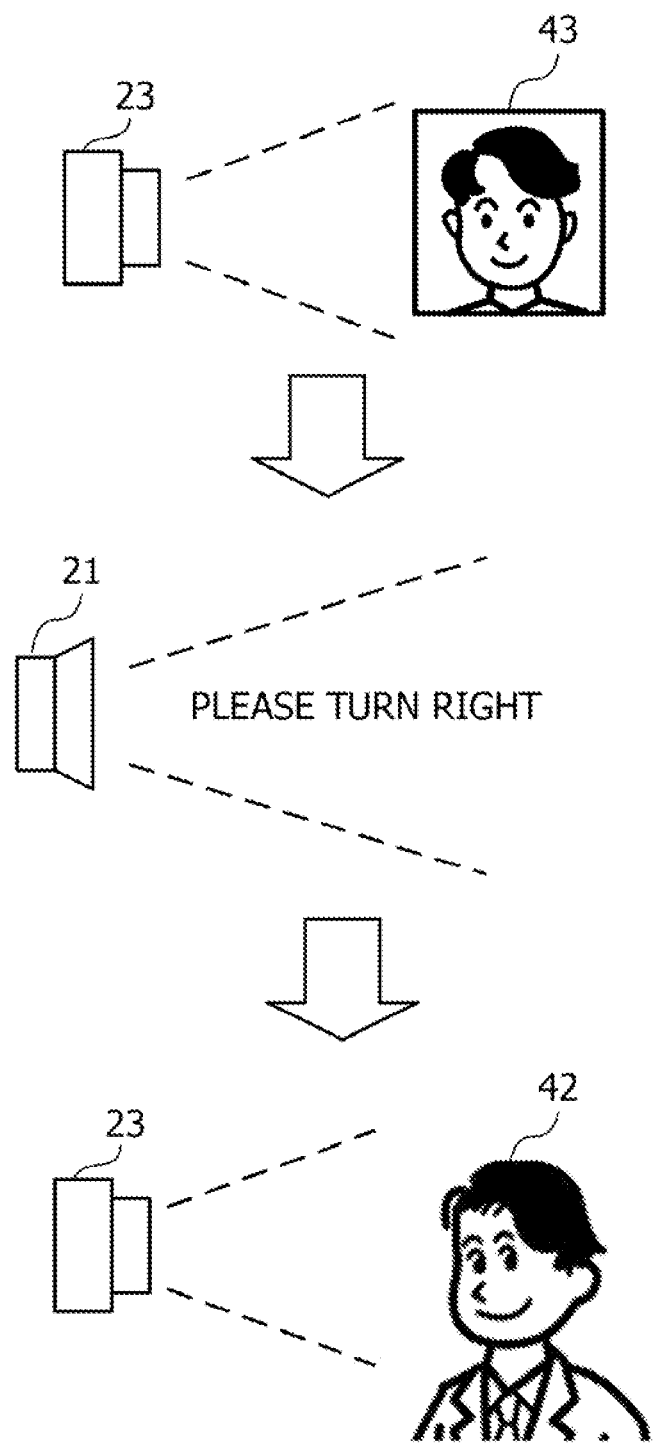
FIG. 8 is a diagram illustrating an outline of an authentication procedure.

FIG. 8 is a diagram illustrating an outline of an authentication procedure. When the image of the photograph 43 is captured by the camera 23, the face authentication device 100 performs face authentication based on a face image imaged in the photograph 43. When the face authentication is succeeded, the face authentication device 100 outputs an action instruction, for example, "please turn right" from the speaker 21. The user 42 who receives the action instruction removes the photograph 43 from the front of the camera 23 and performs the instructed action at a position where the face of the user 42 is imaged by the camera 23. The face authentication device 100 determines whether or not the instructed action is performed, based on a movement of the image of the user 42 imaged by the camera 23.

In the example in FIG. 8, an imaging target of the camera 23 is switched from the photograph 43 to the face of the user 42. In this way, a fraudulent act is considered that makes it appear as if the person in the photograph performs the action by making the action as switching the photograph 43 to the real face of the user 42 after holding the photograph 43.

Note that, as described above, a frame rate at which the image is acquired from the camera 23 depends on a face authentication processing time, and is about five to 10 frames per second. Therefore, there is a good possibility that a situation of removing the photograph 43 from the front of the camera 23 is not imaged by the camera 23. Therefore, it is difficult to detect switching by detecting the image indicating the situation where the imaging target of the camera 23 is switched.

Furthermore, it is considered to register a feature of a face image of a proper user (for example, face image facing right) in the server 200 in advance and performing face authentication on an image after the action instruction. However, a processing load becomes too large. Furthermore, it is not practical to register features of face images of the user for all patterns of the action instruction, considering the time and effort for the registration by the user.

Therefore, the face authentication device 100 combines the contour change degree and the reflection change degree and detects the fraudulent act as illustrated in FIG. 8. By combining the contour change degree and the reflection change degree, switching can be reliably detected. In other words, the reflection change degree is used to detect a change in reflection of light, and it is possible to appropriately capture a difference between reflection of light on a flat photograph and reflection of light on a human face. However, the reflection change degree lacks accuracy if an image blur is large, and there is a possibility that correct determination is not made.

Figure 9:
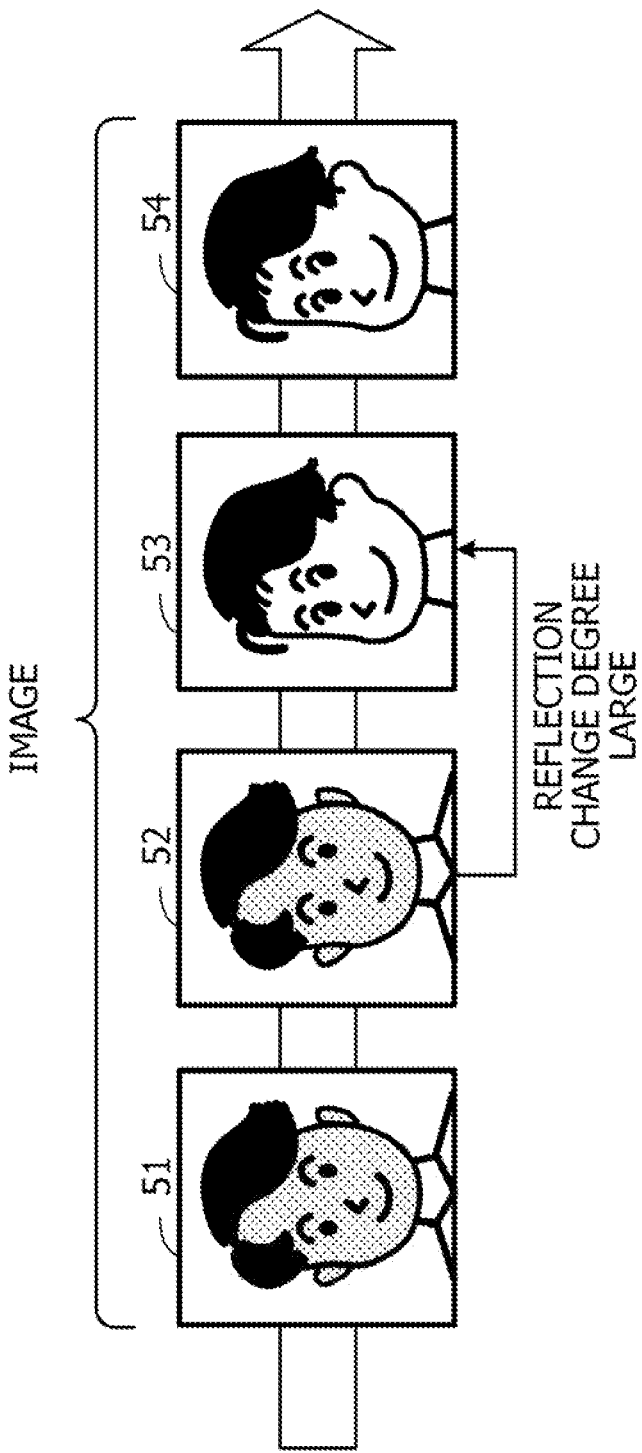
FIG. 9 is a diagram illustrating an example of an image for each frame in a case where an image blur is small.

FIG. 9 is a diagram illustrating an example of an image for each frame in a case where an image blur is small. In the example in FIG. 9, the face authentication device 100 acquires images 51 to 54 in chronological order. In the images 51 and 52, a face image of the person in the photograph 43 is imaged. In the images 53 and 54, a real face image of the user 42 is imaged.

In a case where a blur is small, reflection characteristics of the images 51 to 54 can be correctly represented by pixel value statistics. Therefore, the light reflection characteristics largely change between the image 52 in which a flat photograph is imaged and the image 53 in which a real face is imaged. As a result, a reflection change degree when the images 52 and 53 are compared increases.

Note that, since a position and a size of the face do not largely change between the images 52 and 53, a contour change degree is small. That is, if the user 42 prepares an appropriate photograph 43 according to a position and a size of the face of the user 42 imaged in the camera 23, it is possible to avoid switching detection using the contour change degree. In this way, even in a case where it is difficult to detect the switching with the contour change degree, it is possible to detect the switching using the reflection change degree.

Figure 10:
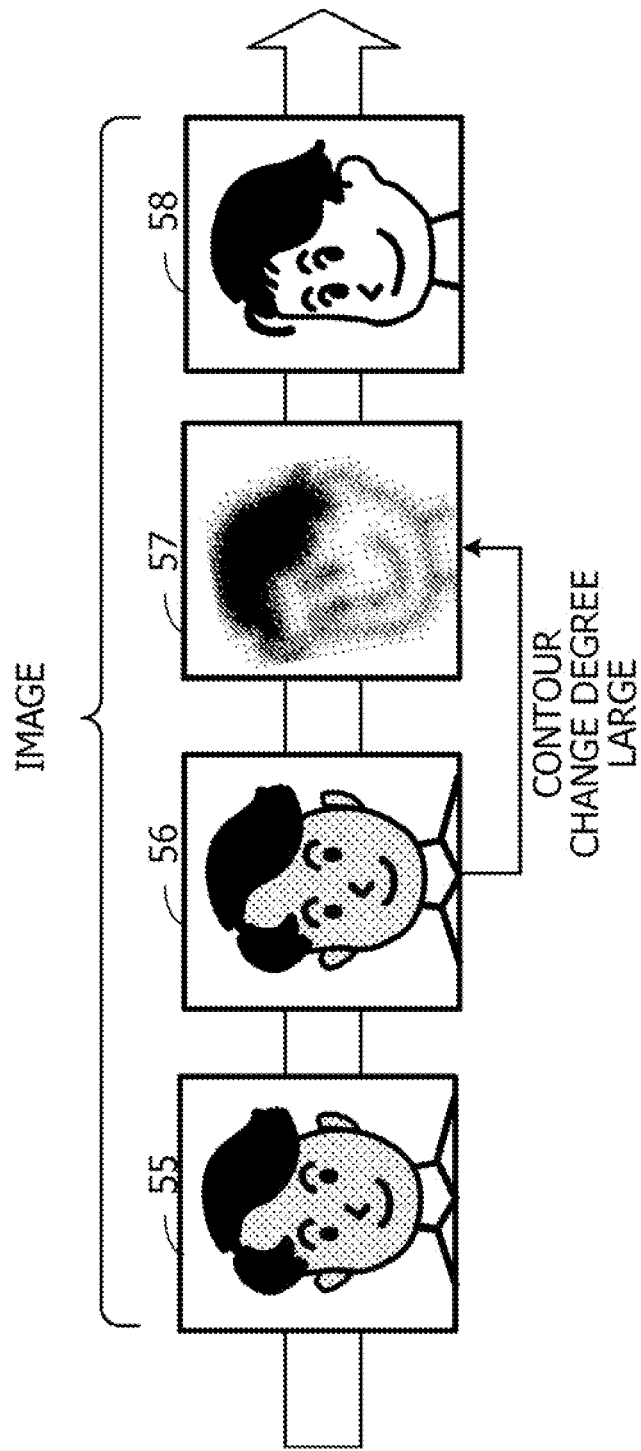
FIG. 10 is a diagram illustrating an example of an image for each frame in a case where the image blur is large.

FIG. 10 is a diagram illustrating an example of an image for each frame in a case where the image blur is large. In the example in FIG. 10, the face authentication device 100 acquires images 55 to 58 in chronological order. In the images 55 and 56, a face image of the person in the photograph 43 is imaged. In the images 57 and 58, a real face image of the user 42 is imaged.

In a case where the blur is large, there is a case where it is not possible to correctly detect reflection characteristics of the images 55 to 58 with pixel value statistics. For example, in the image 57, a portion that should be essentially reflected brightly is dark due to the effect of the blur, and the reflection characteristics are close to that of the image 56. In other words, if the blur is large, accuracy of the reflection change degree drops.

On the other hand, if the blur is large, a position and a thickness of an outline of a face largely change. As a result, a contour change degree when the images 56 and 57 are compared increases. Therefore, if the switching is detected using the contour change degree, it is possible to appropriately determine whether or not the switching has occurred even in a case where the blur is large.

In this way, the switching detection using the reflection change degree and the switching detection using the contour change degree have a mutually complementary relationship. Then, by applying both methods, switching detection accuracy can be improved.

Next, a procedure of authentication processing of the face authentication device 100 will be specifically described.

Figure 11:
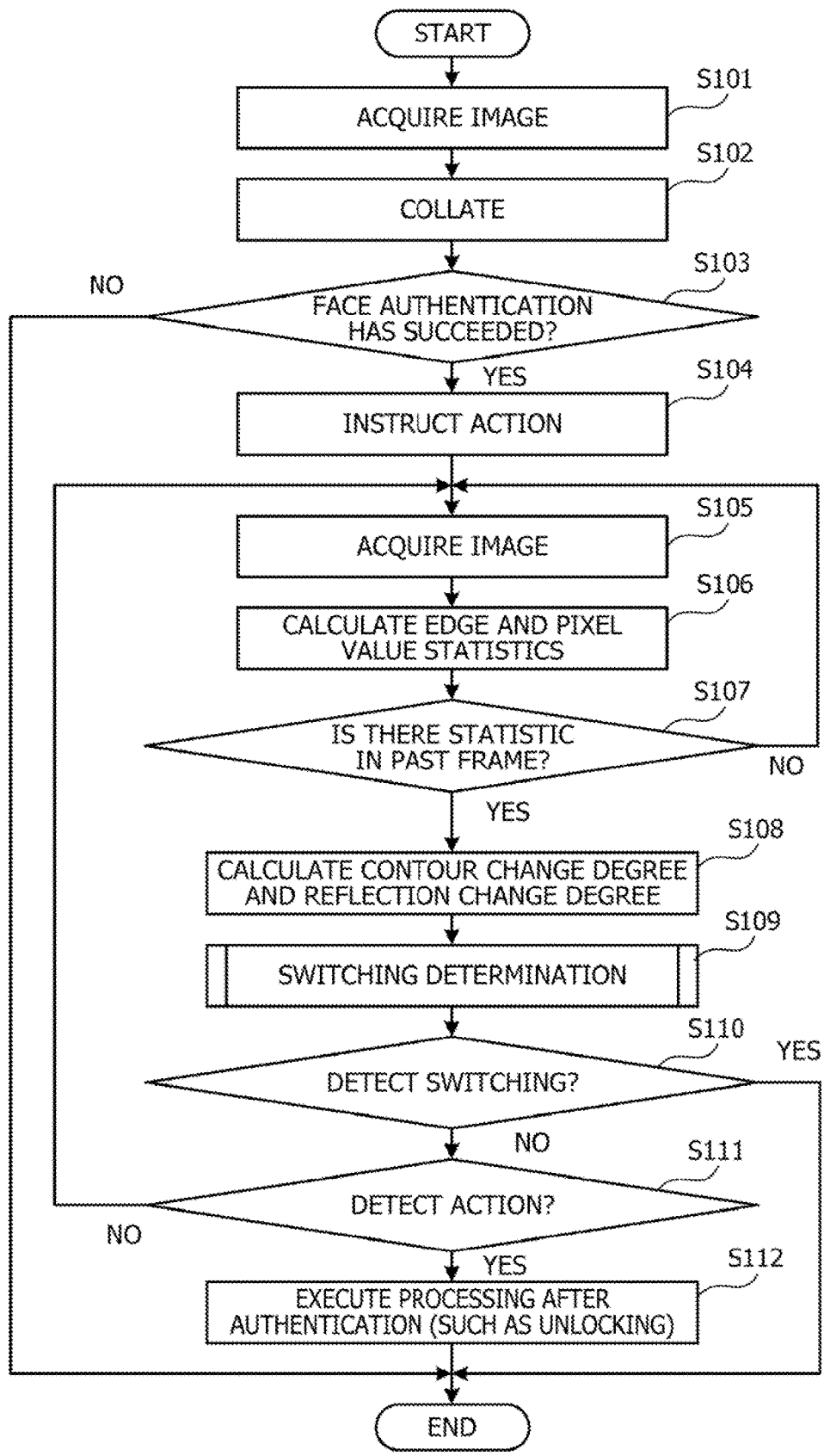
FIG. 11 is a flowchart illustrating an example of a procedure of authentication processing.

FIG. 11 is a flowchart illustrating an example of the procedure of the authentication processing. Hereinafter, the processing illustrated in FIG. 11 will be described in accordance with step numbers.

[Step S101] The image acquisition unit 120 acquires an image captured by the camera 23. The image acquisition unit 120 transmits the acquired image to the collation unit 130.

[Step S102] The collation unit 130 collates a feature indicating a feature of a face image imaged in the image received from the image acquisition unit 120 with a feature indicated in the face image feature data 211 stored in the server 200, in cooperation with the server 200.

[Step S103] The collation unit 130 determines whether or not face authentication has succeeded, as a result of the collation. For example, in a case where the feature of the face image imaged in the image received from the image acquisition unit 120 matches a feature of a face image of any one of users who have permitted to enter the room (or similarity is equal to or more than predetermined value), the collation unit 130 determines that the face authentication has succeeded. In a case where the face authentication has succeeded, the collation unit 130 proceeds the processing to step S104. Furthermore, in a case where the face authentication has failed, the collation unit 130 ends the authentication processing.

[Step S104] The action instruction unit 140 outputs an action instruction to the user 42 via the speaker 21, according a determination result indicating that the face authentication has succeeded by the collation unit 130. The action instruction unit 140, for example, randomly selects one action candidate from among a plurality of action candidates that has been prepared in advance and outputs an action instruction based on audio data corresponding to the selected action candidate.

[Step S105] The image acquisition unit 120 acquires an image from the camera 23. Then, the image acquisition unit 120 recognizes that the action instruction is output from the action instruction unit 140 and transmits the acquired image to the change degree calculation unit 150.

[Step S106] The change degree calculation unit 150 calculates an edge statistic and a pixel value statistic of the acquired image. For example, the change degree calculation unit 150 calculates a histogram of the HLAC as the edge statistic. Furthermore, the change degree calculation unit 150 calculates a histogram of the LBP as the pixel value statistic.

[Step S107] The change degree calculation unit 150 refers to the storage unit 110 and determines whether or not there is a statistic calculated from an image of a past frame. In a case where there is the past statistic, the change degree calculation unit 150 proceeds the processing to step S108. Furthermore, in a case where there is no past statistic, the change degree calculation unit 150 proceeds the processing to step S105.

[Step S108] The change degree calculation unit 150 calculates a contour change degree and a reflection change degree. For example, the change degree calculation unit 150 acquires an edge statistic of the most recent frame in the past, from the storage unit 110. The change degree calculation unit 150 calculates the contour change degree based on the edge statistic acquired from the storage unit 110 and the edge statistic calculated in step S106. For example, the change degree calculation unit 150 can set a distance between vectors of the two edge statistics as the contour change degree. Furthermore, the change degree calculation unit 150 may set a reciprocal of a similarity between the vectors of the two edge statistics as the contour change degree. In a case where the vectors are normalized, the similarity of the vectors is obtained, for example, according to an inner product of the vectors.

Furthermore, the change degree calculation unit 150 acquires a pixel value statistic of the most recent frame in the past, from the storage unit 110. The change degree calculation unit 150 calculates a reflection change degree based on the pixel value statistic acquired from the storage unit 110 and the pixel value statistic calculated in step S106. For example, the change degree calculation unit 150 can set a distance between vectors of the two pixel value statistics as the reflection change degree. Furthermore, the change degree calculation unit 150 may set a reciprocal of a similarity between the vectors of the two pixel value statistics as the reflection change degree.

[Step S109] The switching determination unit 160 executes the switching determination processing, based on the contour change degree and the reflection change degree calculated by the change degree calculation unit 150. Whether or not the imaging targets of the camera 23 are switched is determined through the switching determination processing. Details of the switching determination processing will be described later (refer to FIG. 12).

[Step S110] The switching determination unit 160 determines whether or not the switching is detected. In a case where the switching is detected, the switching determination unit 160 ends the authentication processing. Furthermore, in a case where the switching is not detected, the switching determination unit 160 proceeds the processing to step S111.

[Step S111] The action detection unit 170 acquires an image from the image acquisition unit 120 and detects a specified action. For example, in a case where an action for turning to the right is specified, the action detection unit 170 can determine whether or not the face has turned to the right, by comparing a positional relationship between the contour of the face and the nose imaged in the image with a past image. In a case of detecting the specified action, the action detection unit 170 proceeds the processing to step S112. Furthermore, in a case where it is not possible to detect the specified action, the action detection unit 170 proceeds the processing to step S105.

[Step S112] The key control unit 180 or the registration unit 190 executes processing after the authentication. For example, at the time when the user 42 enters the room, the key control unit 180 controls the door 41 to be unlocked.

In this way, in a case where the face authentication has succeeded and the instructed action is detected without detecting the switching, predetermined processing such as unlocking the door 41 is executed. Next, the details of the switching determination processing will be described.

Figure 12:
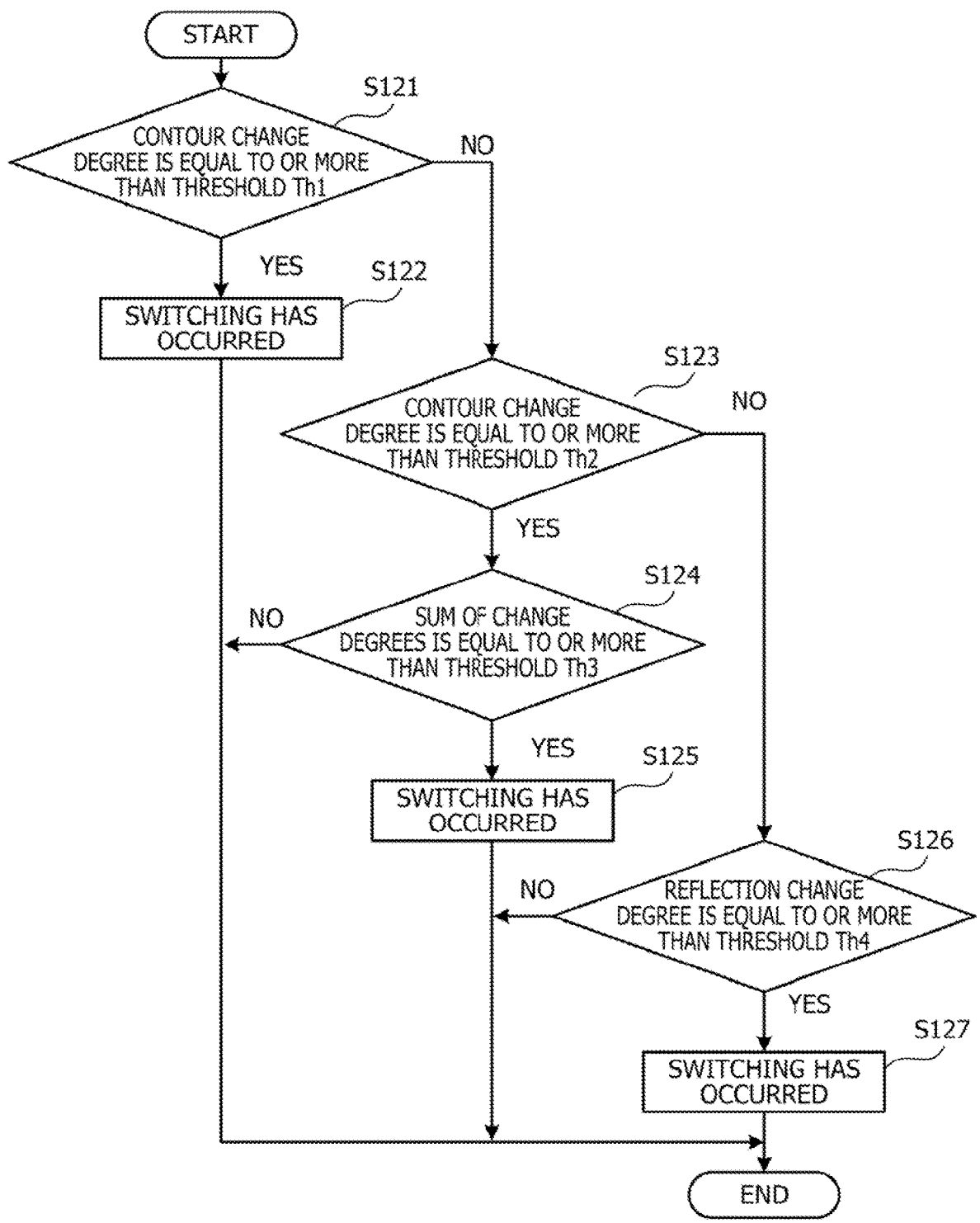
FIG. 12 is a flowchart illustrating an example of a procedure of switching determination processing.

FIG. 12 is a flowchart illustrating an example of a procedure of the switching determination processing. Hereinafter, the processing illustrated in FIG. 12 will be described in accordance with step numbers.

[Step S121] The switching determination unit 160 determines whether or not the contour change degree is equal to or more than a threshold Th1. If the contour change degree is equal to or more than the threshold Th1, the switching determination unit 160 proceeds the processing to step S122. Furthermore, if the contour change degree is less than the threshold Th1, the switching determination unit 160 proceeds the processing to step S123.

[Step S122] The switching determination unit 160 determines that the imaging targets of the camera 23 are switched, and ends the processing.

[Step S123] The switching determination unit 160 determines whether or not the contour change degree is equal to or more than a threshold Th2 (threshold Th2<threshold Th1). If the contour change degree is equal to or more than the threshold Th2, the switching determination unit 160 proceeds the processing to step S124. Furthermore, if the contour change degree is less than the threshold Th2, the switching determination unit 160 proceeds the processing to step S126.

[Step S124] The switching determination unit 160 determines whether or not a sum of the contour change degree and the reflection change degree is equal to or more than a threshold Th3 (threshold Th3>threshold Th2). If the sum is equal to or more than the threshold Th3, the switching determination unit 160 proceeds the processing to step S125. Furthermore, if the sum is less than the threshold Th3, the switching determination unit 160 ends the switching determination processing.

[Step S125] The switching determination unit 160 determines that the imaging targets of the camera 23 are switched, and ends the processing.

[Step S126] The switching determination unit 160 determines whether or not the reflection change degree is equal to or more than a threshold Th4. If the reflection change degree is equal to or more than the threshold Th4, the switching determination unit 160 proceeds the processing to step S127. Furthermore, if the reflection change degree is less than the threshold Th4, the switching determination unit 160 ends the switching determination processing.

[Step S127] The switching determination unit 160 determines that the imaging targets of the camera 23 are switched, and ends the processing.

Note that the threshold Th1 illustrated in FIG. 12 is an example of the first threshold in the first embodiment. The threshold Th4 is an example of the second threshold in the first embodiment. The threshold Th3 is an example of the third threshold in the first embodiment.

In this way, in a case where at least one of the contour change degree and the reflection change degree is equal to or more than the respective thresholds, the switching is detected. As a result, it is possible to detect the switching with high accuracy without being affected by the image blur. That is, if the image blur is small, it is possible to detect the switching with high accuracy based on the reflection change degree. Furthermore, in a case where the image blur is large, the switching is detected based on the contour change degree. Therefore, if the user 42 tries to avoid to detect the switching based on the reflection change degree using the image blur, it is determined as switching based on the contour change degree, and to pass unauthorized authentication is prevented.

Furthermore, in a case where the sum of the contour change degree and the reflection change degree is too large, the switching is detected. By using the sum of the contour change degree and the reflection change degree, even in a case where whether or not the switching is performed is unknown by using only one of the contour change degree and the reflection change degree, it is possible to appropriately detect the switching.

For example, as a cause of a small blur, both of a case of switching and a case of a face movement of a real person are considered. Even in such a case, it is possible to appropriately determine whether or not the switching has occurred according to the sum of both of the contour change degree and the reflection change degree.

Moreover, calculation of the reflection change degree and the contour change degree only needs to compare two images that are consecutive in chronological order. On the other hand, when an individual is identified through face authentication, the feature of the face image imaged in the acquired image is collated with features of a large number of users stored in the server 200, and a processing amount increases. Therefore, by detecting the switching using the reflection change degree and the contour change degree, a smaller calculation cost is needed as compared with feature extraction for face authentication. Since the calculation cost is small, it is possible to perform calculation for each frame, and it is possible to execute switching detection processing in real time.

Note that, in the calculation of the sum of the contour change degree and the reflection change degree, by normalizing the contour change degree and the reflection change degree, it is possible to equalize the effect of the contour change degree and the reflection change degree.

Figure 13:
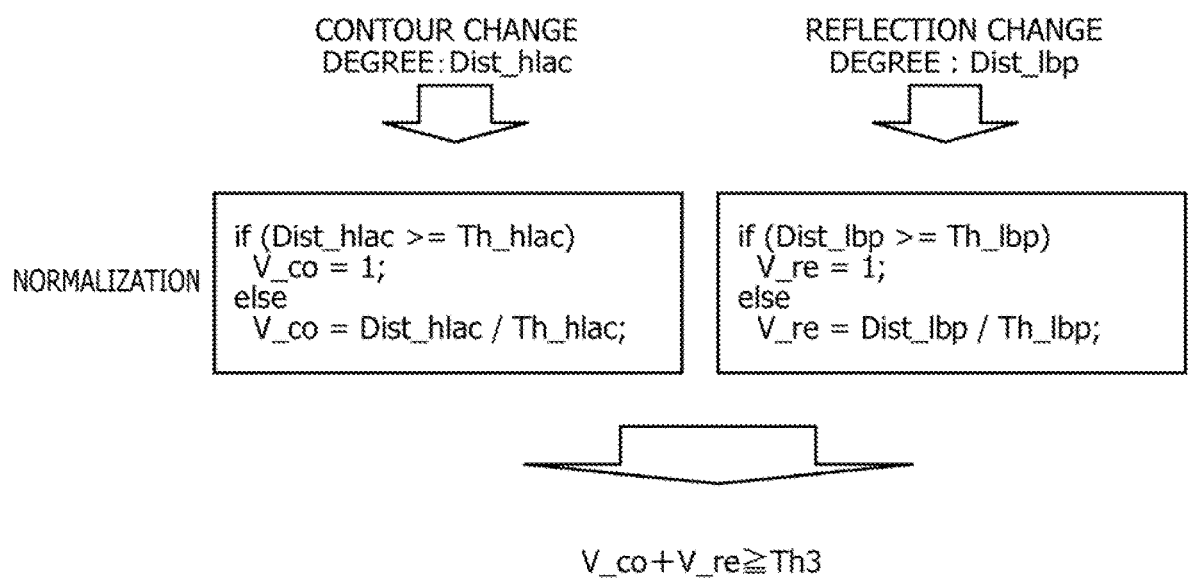
FIG. 13 is a diagram illustrating an example of normalization of a contour change degree and a reflection change degree.

FIG. 13 is a diagram illustrating an example of normalization of the contour change degree and the reflection change degree. In the example in FIG. 13, a case is assumed where an HLAC histogram is used as the edge statistic and an LBP histogram is used as the pixel value statistic.

A threshold "Th_hlac" is determined in advance for a distance of the HLAC "Dist_hlac". The threshold "Th_hlac" is, for example, the threshold "Th1" illustrated in FIG. 12. In a case where "Dist_hlac≥Th_hlac" is satisfied, the switching determination unit 160 sets a contour change degree "V_co" to "1". In a case where "Dist_hlac≥Th_hlac" is not satisfied, the switching determination unit 160 sets the contour change degree "V_co" to "Dist_hlac/Th_hlac".

Furthermore, a threshold "Th_lbp" is determined in advance for an LBP distance "Dist_lbp". The threshold "Th_lbp" is, for example, the threshold "Th4" illustrated in FIG. 12. In a case where "Dist_lbp≥Th_lbp" is satisfied, the switching determination unit 160 sets a reflection change degree "V_re" to "one". In a case where "Dist_lbp≥Th_lbp" is not satisfied, the switching determination unit 160 sets the reflection change degree "V_re" to "Dist_lbp/Th_lbp".

By normalizing the contour change degree and the reflection change degree in this way, the effects on each of the sum of the contour change degree and the sum of the reflection change degree are equalized. Then, when the sum of the contour change degree and the reflection change degree is compared with the threshold Th3, a magnitude of the contour change degree and a magnitude of the reflection change degree are equally evaluated.

Note that, the switching detection processing by the face authentication device 100 does not need to register personal information of a user for switching detection can be used at the time when a feature of a face image is registered. When the feature of the face image of the user 42 is registered in the server 200, it is possible to prevent the feature of the face image of the image from being registered using the photograph 43 of another person, by detecting the switching of the imaging targets of the camera 23. For example, when the user 42 inputs a predetermined password using the operation key 22 of the face authentication device 100, the face authentication device 100 is in an input mode for an image feature of a new face image. If the face is imaged in front of the camera 23 in this state, a feature of the imaged face image is registered in the server 200. At this time, when the user 42 holds the photograph 43 in which the another person is imaged in front of the camera 23, there is a possibility that a feature of a face image of the another person is registered in the server 200. Therefore, the face authentication device 100 prevents unauthorized registration of a face image feature by performing action determination involving switching detection at the time of registration of a face image feature.

Figure 14:
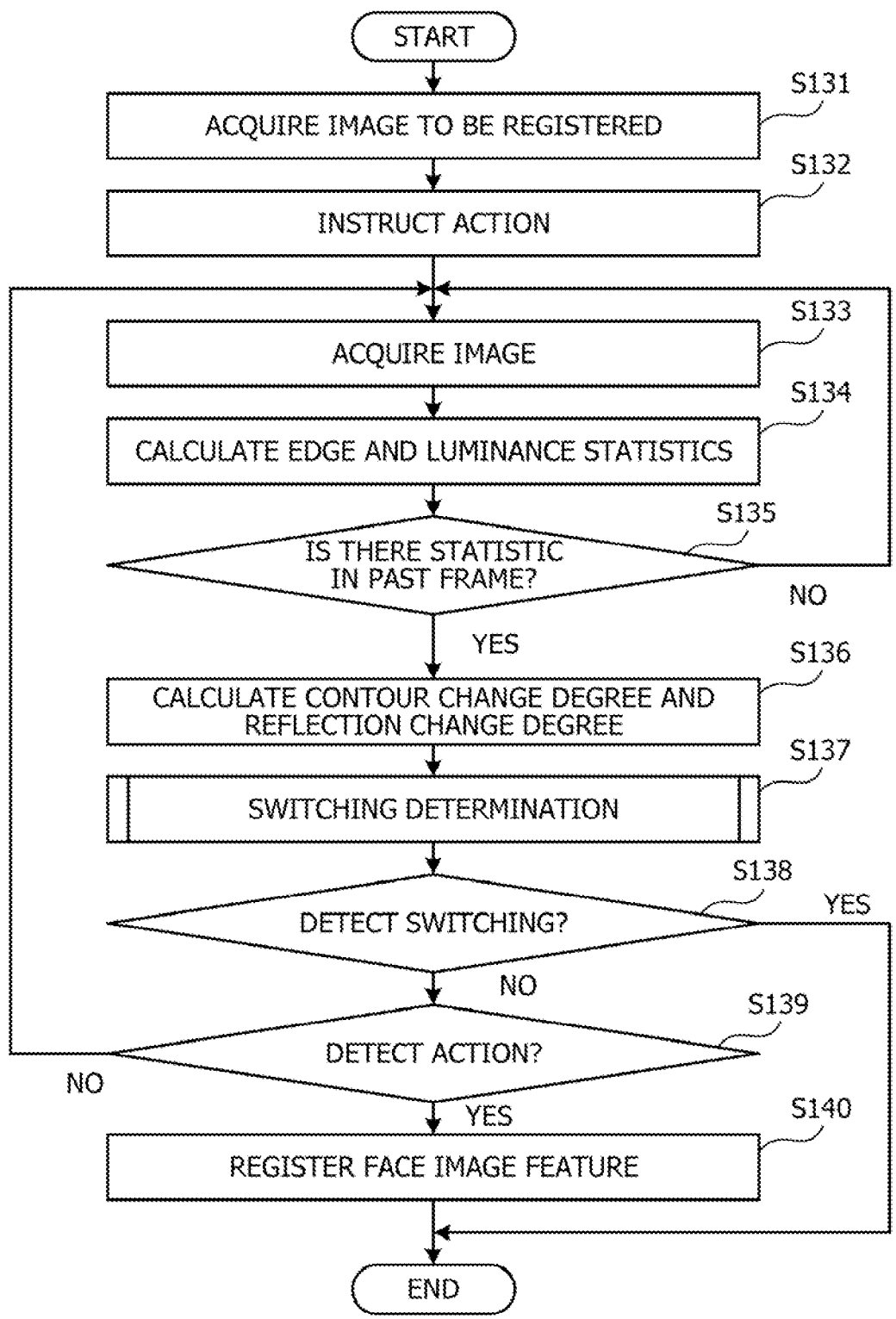
FIG. 14 is a flowchart illustrating an example of a procedure of face image feature registration processing.

FIG. 14 is a flowchart illustrating an example of a procedure of face image feature registration processing. Steps S132 to S139 in the processing illustrated in FIG. 14 are respectively the same as the processing in steps S104 to S111 in the processing illustrated in FIG. 11. Hereinafter, processing in steps S131 and S140 that is different from that in FIG. 11 will be described.

[Step S131] The image acquisition unit 120 acquires an image to be registered from the camera 23. The image acquisition unit 120 transmits the acquired image to the registration unit 190. Thereafter, in steps S132 to S139, an action instruction, switching determination according to an image after the action instruction, and detection of the instructed action are performed. Then, in a case where the instructed action is detected without detecting the switching, the processing proceeds to step S140.

[Step S140] The registration unit 190 registers a feature of a face image imaged in the image acquired from the image acquisition unit 120 in the server 200.

In this way, by executing the action determination processing involving the switching detection at the time of registration of the face image feature, the registration of the feature of the face image with the photograph 43 of the another person can be prevented.

Third Embodiment

Next, a third embodiment will be described. The third embodiment uses a reflection score indicating whether or not there is reflection, which is likely to be a forgery, in a pixel for switching detection, in addition to a contour change degree and a reflection change degree. The reflection score is calculated based on a specular reflection component and a diffuse reflection component obtained from an image.

For example, a face authentication device 100 or a server 200 generates a machine learning model using pixel value statistics in a specular reflection component and a diffuse reflection component calculated from a large number of images of a real one or a forgery in advance. The generated model is a calculation model that calculates the reflection score indicating a forgery degree, for example, using the specular reflection component and the diffuse reflection component of the image (or statistics of pixel values of these) as inputs. The calculated reflection score is, for example, designed to be larger as the image is more likely to be the forgery. For example, if the captured image is a photographic image, the specular reflection component increases in the entire screen. Reflecting such tendency in a model increases the reflection score for the photographic image.

A change degree calculation unit 150 of the face authentication device 100 calculates the reflection score using a model that is prepared in advance when calculating the contour change degree and the reflection change degree. Then, a switching determination unit 160 executes switching determination processing using the contour change degree, the reflection change degree, and the reflection score.

Figure 15:
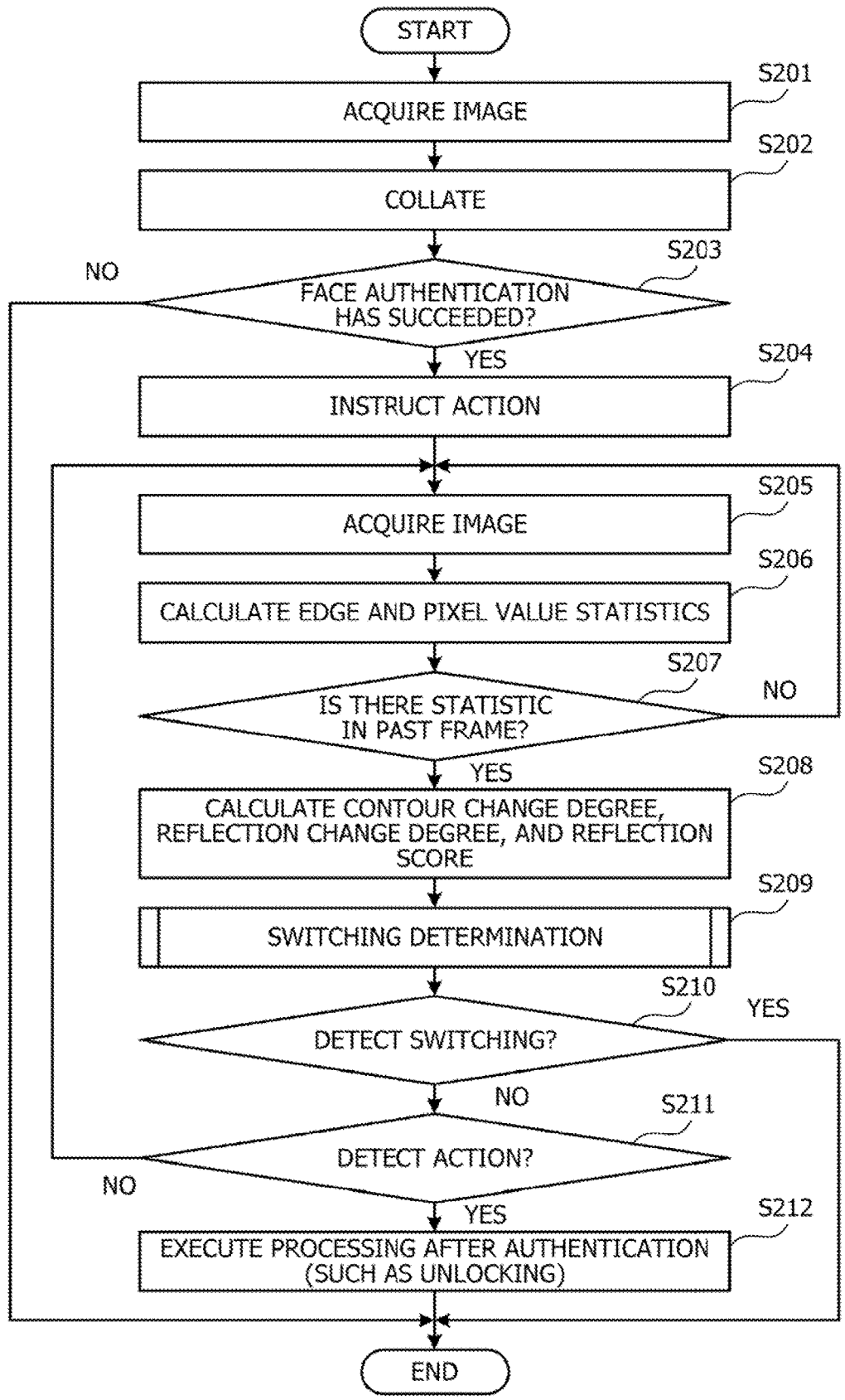
FIG. 15 is a flowchart illustrating an example of a procedure of authentication processing in a case where a reflection score is used.

FIG. 15 is a flowchart illustrating an example of a procedure of authentication processing in a case where the reflection score is used. Steps S201 to S207 and S210 to S212 in the processing illustrated in FIG. 14 are respectively the same as the processing in steps S101 to S107 and S110 to S112 in the processing illustrated in FIG. 11. Hereinafter, processing in steps S208 and S209 is different from that in the processing in FIG. 11 will be described.

[Step S208] The change degree calculation unit 150 calculates the contour change degree, the reflection change degree, and the reflection score. A method for calculating the contour change degree and the reflection change degree is similar to that in the processing in step S108 illustrated in FIG. 11. In order to calculate the reflection score, the change degree calculation unit 150 separates a component of each pixel of the image acquired in step S205 into the specular reflection component and the diffuse reflection component.

Next, the change degree calculation unit 150 inputs the specular reflection component and the diffuse reflection component (or statistics of pixel values of these) into a model for reflection score calculation and calculates the reflection score by performing calculation according to the model.

[Step S209] The switching determination unit 160 executes the switching determination processing based on the contour change degree, the reflection change degree, and the reflection score calculated by the change degree calculation unit 150.

Figure 16:
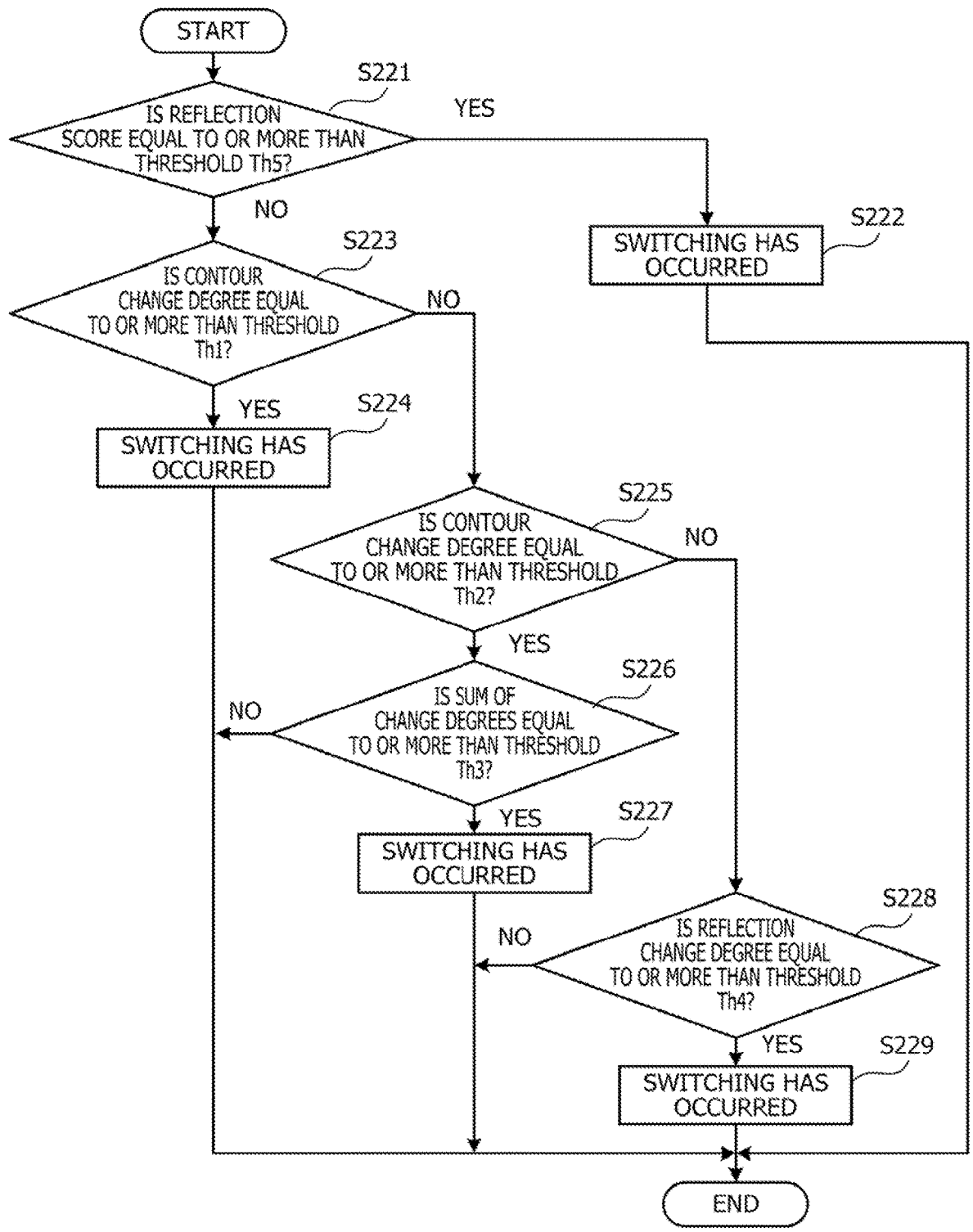
FIG. 16 is a flowchart illustrating an example of a procedure of switching determination processing in a case where the reflection score is used.

FIG. 16 is a flowchart illustrating an example of a procedure of the switching determination processing in a case where the reflection score is used. Steps S223 to S229 in the processing illustrated in FIG. 16 are respectively the same as the processing in steps S121 to S127 in the processing illustrated in FIG. 12. Hereinafter, processing in steps S221 and S222 different from that in the processing in FIG. 12 will be described.

[Step S221] The switching determination unit 160 determines whether or not the reflection score calculated by the change degree calculation unit 150 is equal to or more than a threshold Th5. If the reflection score is equal to or more than the threshold Th5, the switching determination unit 160 proceeds the processing to step S222. Furthermore, if the reflection score is less than the threshold Th5, the switching determination unit 160 proceeds the processing to step S223.

[Step S222] The switching determination unit 160 determines that an imaging target of a camera 23 is switched and ends the processing.

By determining whether or not the switching has occurred using the reflection score in this way, it is possible to improve determination accuracy. Note that the threshold Th5 illustrated in FIG. 16 is an example of the fourth threshold according to the first embodiment.

Fourth Embodiment

In the second and third embodiments, the action determination processing involving the switching determination is executed after face authentication is succeeded through the collation processing using the face image. However, there is a case where the collation processing is executed after the action determination processing. In that case, for example, a face authentication device 100 saves an image acquired during the action determination processing in a memory 102 or a storage device 103 and executes the collation processing for face authentication using the saved image.

At this time, there is a possibility that a user 42 holds a photograph 43 in front of a camera 23 at any timing after an action instruction is output. If there is one image for which the face authentication is succeeded among the images acquired during the action determination processing, there is a possibility that the face authentication device 100 succeeds the face authentication. Even in such a case, by performing switching determination during the action determination processing, it is possible to prevent a fraudulent act.

Figure 17:
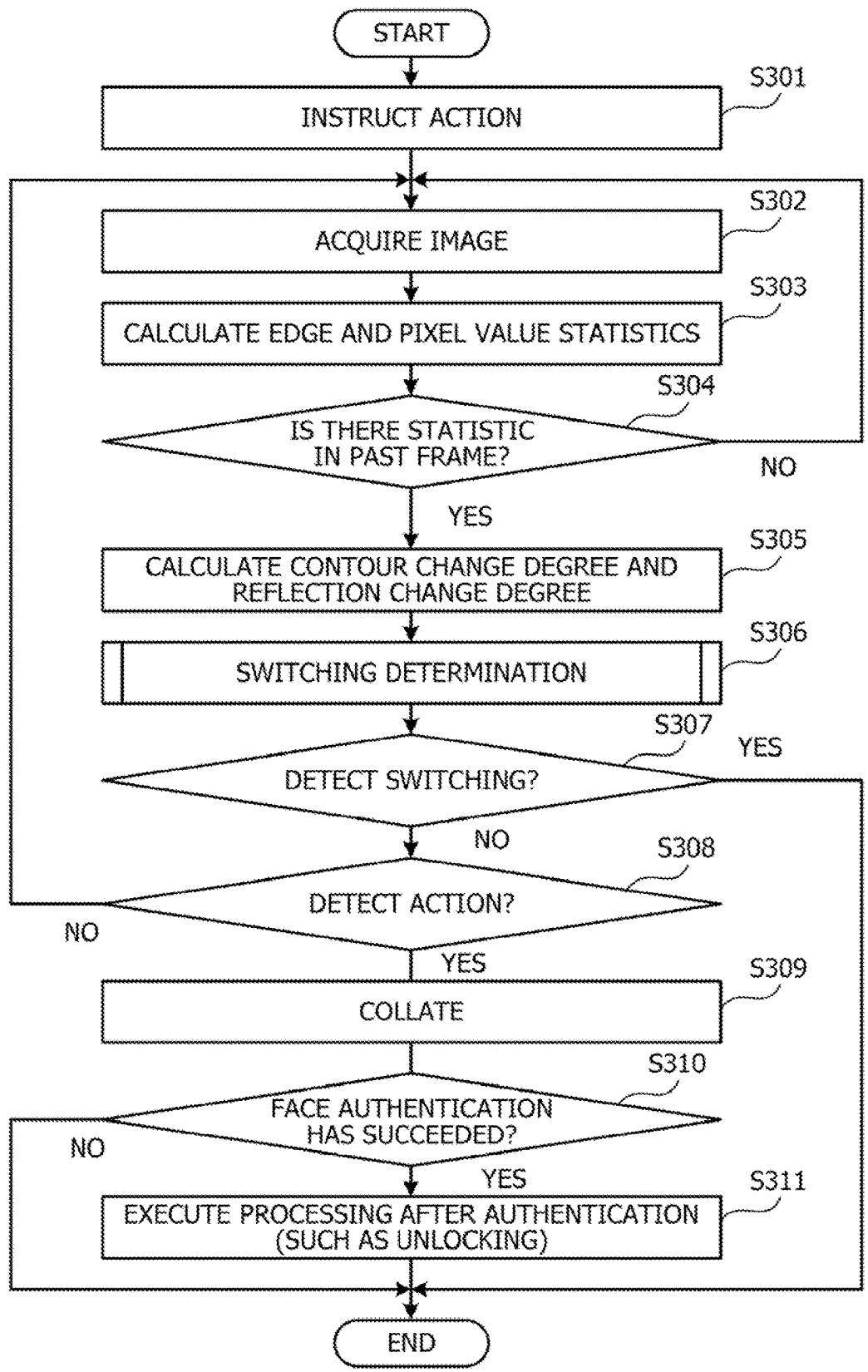
FIG. 17 is a flowchart illustrating an example of a procedure of authentication processing for performing collation with an image during action determination.

FIG. 17 is a flowchart illustrating an example of a procedure of authentication processing for performing collation with an image during action determination. Steps S301 and S303 to S308 in the processing illustrated in FIG. 17 are respectively the same as the processing in steps S104 and S106 to S111 illustrated in FIG. 11. Furthermore, steps S310 and S311 are respectively the same as the processing in steps S103 and S112 illustrated in FIG. 11. Hereinafter, processing in steps S302 and S309 different from that in the processing in FIG. 11 will be described.

[Step S302] An image acquisition unit 120 acquires an image from the camera 23. Then, the image acquisition unit 120 recognizes that an action instruction is output from an action instruction unit 140, transmits the acquired image to a change degree calculation unit 150, and stores the acquired image in the memory 102 or the storage device 103.

The image acquisition in step S302 is repeatedly performed until the action specified in step S308 is detected, and the acquired image is accumulated in the memory 102 or the storage device 103. When the action specified in step S308 is detected, the processing proceeds to step S309.

[Step S309] A collation unit 130 collates a feature indicating a feature of a face image imaged in the image accumulated in the memory 102 or the storage device 103 with a feature indicated in face image feature data 211 stored in a server 200, in cooperation with the server 200. For example, the collation unit 130 selects one or more images suitable for collation, from among the plurality of accumulated images. The image suitable for the collation is an image with a small blur in which a face from the front side is imaged, for example. Then, the collation unit 130 collates a feature indicating a feature of a face image imaged in the selected image with the feature indicated in the face image feature data 211 stored in the server 200. If face authentication is succeeded through the collation, processing such as unlocking is executed.

In such collation processing, it is assumed that the user 42 hold the photograph 43 in front of the camera 23 at an arbitrary timing after the action instruction is output and keep the photograph 43 for a certain period of time without moving the photograph 43 so as not to cause a blur. In this case, since an image of a real face in the middle of the action is likely to be blurred, if the switching determination processing is not executed, there is a high possibility that the image of the photograph 43, in which the face from the front side is imaged, with a small blur is selected as an image for collation. On the other hand, since the switching determination processing is executed during the action determination in the processing in FIG. 17, it is possible to detect the switching of the imaging targets of the camera 23 based on the reflection change degree and to prevent successful authentication by the fraudulent act.

Other Embodiments

In the second to fourth embodiments, as the reflection change degree, the change degree of the LBP histogram is calculated. However, other statistics may be used. For example, a correlation of luminance values between two images that are consecutive in chronological order may be used as the reflection change degree.

Furthermore, in the second to fourth embodiments, as the contour change degree, the change degree of the HLAC histogram is calculated. However, other statistics may be used. For example, a Laplacian correlation between two images that are consecutive in chronological order may be used as the contour change degree.

Furthermore, in the second to fourth embodiments, the pixel value statistic is calculated based on the face image of the region where the face is imaged. However, the pixel value statistic may be calculated based on an image of a partial region of the face. For example, the pixel value statistic may be calculated from an image around the cheeks that is unlikely to be affected from others. The positions of the cheeks can be specified, for example, from a relative positional relationship of the eyes, the nose, and the mouth. If the pixel value statistic is calculated using the image of the cheek, an effect of hair wave or the like is less than that of the entire face, and accuracy of the reflection change degree is improved.

Furthermore, in the second to fourth embodiments, the edge statistic of the entire face is calculated. However, an edge statistic of a partial region of the face may be calculated. For example, the edge statistic may be calculated from vicinity of the nose that is unlikely to be affected from others. If the edge statistic is calculated using the image around the nose, an effect of hair wave or the like is less than that of the entire face, and accuracy of the contour change degree is improved.

Furthermore, in the second and third embodiments, the face authentication device 100 is used for managing the entry to the office 40. However, the face authentication device 100 can be used for other applications. For example, the functions illustrated in the face authentication device 100 can be applied to identity verification of an account holder at an ATM, identity verification of a user in various devices such as a computer, or the like.

The above description merely indicates the principle of the present invention. Moreover, numerous modifications and changes can be made by those skilled in the art. The present invention is not limited to the exact configuration and application examples illustrated and described above, and all corresponding modifications and equivalents are regarded within the scope of the present invention by appended claims and equivalents thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A face authentication method for a computer to execute a process comprising:
   acquiring a plurality of images from a camera;
   acquiring a contour change degree that represents a difference between a first contour included in an image imaged in a first image and a second contour included in the face image imaged in a second image, the plurality of images including the first image and the second image;
   acquiring a reflection change degree that represents a difference between first light reflection characteristic of the first image and second light reflection characteristic of the second image; and
   determining that imaging targets of the camera has switched when a sum of the contour change degree and the reflection change degree is equal to or more than a third threshold.

2. The face authentication method according to claim 1, wherein the process further comprising:
   executing face authentication processing based on a biometric feature represented by a face image imaged in a third image among the plurality of images;
   executing action determination processing of determining whether a certain action is performed based on an acquired fourth image after an instruction of the certain action to a person who is the imaging target of the camera; and
   executing processing according to authentication success when authentication is succeeded in the face authentication processing and the certain action is performed in the action determination processing.

3. The face authentication method according to claim 2, wherein
   the acquiring the contour change degree, the acquiring the reflection change degree, and the determining are executed for each pair of images that are acquired in a period that includes a time when the third image is acquired and a time when the fourth image is acquired.

4. The face authentication method according to claim 1, wherein the process further comprising
   acquiring a reflection score selected from a reflection score of a specular reflection component and a diffuse reflection component of the first image,
   wherein the determining includes determining that the imaging targets of the camera has switched when the reflection score is equal to or more than a fourth threshold.

5. A non-transitory computer-readable storage medium storing a face authentication program that causes at least one computer to execute a process, the process comprising:
   acquiring a plurality of images from a camera;
   acquiring a contour change degree that represents a difference between a first contour included in an image imaged in a first image and a second contour included in the face image imaged in a second image, the plurality of images including the first image and the second image;
   acquiring a reflection change degree that represents a difference between first light reflection characteristic of the first image and second light reflection characteristic of the second image; and
   determining that imaging targets of the camera has switched when a sum of the contour change degree and the reflection change degree is equal to or more than a third threshold.

6. The non-transitory computer-readable storage medium according to claim 5, wherein the process further comprising:
   executing face authentication processing based on a biometric feature represented by a face image imaged in a third image among the plurality of images;
   executing action determination processing of determining whether a certain action is performed based on an acquired fourth image after an instruction of the certain action to a person who is the imaging target of the camera; and
   executing processing according to authentication success when authentication is succeeded in the face authentication processing and the certain action is performed in the action determination processing.

7. The non-transitory computer-readable storage medium according to claim 6, wherein
   the acquiring the contour change degree, the acquiring the reflection change degree, and the determining are executed for each pair of images that are acquired in a period that includes a time when the third image is acquired and a time when the fourth image is acquired.

8. The non-transitory computer-readable storage medium according to claim 5, wherein the process further comprising acquiring a reflection score selected from a reflection score of a specular reflection component and a diffuse reflection component of the first image, wherein the determining includes determining that the imaging targets of the camera has switched when the reflection score is equal to or more than a fourth threshold.

9. A face authentication device comprising:

one or more memories; and one or more processors coupled to the one or more memories and the one or more processors configured to:

acquire a plurality of images from a camera, acquire a contour change degree that represents a difference between a first contour included in an image imaged in a first image and a second contour included in the face image imaged in a second image, the plurality of images including the first image and the second image, acquire a reflection change degree that represents a difference between first light reflection characteristic of the first image and second light reflection characteristic of the second image, and determine that imaging targets of the camera has switched when sum of the contour change degree and the reflection change degree is equal to or more than a third threshold.

10. The face authentication device according to claim 9, wherein the one or more processors are further configured to:

execute face authentication processing based on a biometric feature represented by a face image imaged in a third image among the plurality of images, execute action determination processing of determining whether a certain action is performed based on an acquired fourth image after an instruction of the certain action to a person who is the imaging target of the camera, and execute processing according to authentication success when authentication is succeeded in the face authentication processing and the certain action is performed in the action determination processing.

11. The face authentication device according to claim 10, wherein the acquiring the contour change degree, the acquiring the reflection change degree, and the determining are executed for each pair of images that are acquired in a period that includes a time when the third image is acquired and a time when the fourth image is acquired.

12. The face authentication device according to claim 9, wherein the one or more processors are further configured to:

acquire a reflection score selected from a reflection score of a specular reflection component and a diffuse reflection component of the first image, and determine that the imaging targets of the camera has switched when the reflection score is equal to or more than a fourth threshold.

* * * * *